(12) United States Patent
Kobayashi

(10) Patent No.: US 8,705,329 B2
(45) Date of Patent: Apr. 22, 2014

(54) MANUFACTURING METHOD FOR OPTICAL DISC, OPTICAL DISC, PLAYBACK METHOD FOR OPTICAL DISC, PLAYBACK APPARATUS FOR OPTICAL DISC, RECORDING APPARATUS FOR OPTICAL DISC

(71) Applicant: Sony Corporation, Minato-ku (JP)

(72) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/629,870

(22) Filed: Sep. 28, 2012

(65) Prior Publication Data

US 2013/0028067 A1 Jan. 31, 2013

Related U.S. Application Data

(62) Division of application No. 12/993,227, filed as application No. PCT/JP2010/003113 on May 6, 2010, now Pat. No. 8,498,185.

(30) Foreign Application Priority Data

May 11, 2009 (JP) ................................ 2009-114241

(51) Int. Cl.
  *G11B 5/09* (2006.01)
(52) U.S. Cl.
  USPC ....................................................... 369/47.47
(58) Field of Classification Search
  None
  See application file for complete search history.

(56) References Cited

U.S. PATENT DOCUMENTS

| 5,408,531 | A | 4/1995 | Nakajima et al. |
| 5,931,927 | A * | 8/1999 | Takashima ...................... 710/65 |
| 6,628,591 | B1 * | 9/2003 | Yokota et al. .............. 369/53.21 |
| 7,403,461 | B2 | 7/2008 | Kobayashi |
| 8,218,408 | B2 * | 7/2012 | Kimura et al. ............. 369/47.17 |
| 2005/0068874 | A1 | 3/2005 | Heemskerk et al. |
| 2009/0180365 | A1 * | 7/2009 | Kimura et al. ............. 369/47.17 |

FOREIGN PATENT DOCUMENTS

| CN | 1647185 | 7/2005 |
| EP | 0 533 204 A2 | 3/1993 |
| EP | 1 435 607 A1 | 7/2004 |
| EP | 1 729 299 A2 | 12/2006 |

(Continued)

OTHER PUBLICATIONS

U.S. Appl. No. 13/629,850, filed Sep. 28, 2012, Kobayashi.
U.S. Appl. No. 13/629,829, filed Sep. 28, 2012, Kobayashi.
U.S. Appl. No. 13/629,811, filed Sep. 28, 2012, Kobayashi.
Extended European Search Report issued Nov. 14, 2011 in European application Serial No. 10774697.6.

(Continued)

*Primary Examiner* — Joseph Feild
*Assistant Examiner* — Parul Gupta
(74) *Attorney, Agent, or Firm* — Oblon, Spivak, McClelland, Maier & Neustadt, L.L.P.

(57) ABSTRACT

Address information that has been error correction encoded is recorded on a second version of a recording medium after being transformed such that such that the address decoding cannot be performed by a playback device that is not compatible with the second version of the recording medium. The address decoding for the second version of the recording medium cannot be performed by the incompatible playback device (for example, a playback device that was manufactured to be compatible only with a first version of the recording medium). In other words, in the playback device that is not compatible with the second version of the recording medium, a state is created in which address errors cannot be corrected, so access is impossible (recording and playback are impossible).

11 Claims, 18 Drawing Sheets

(56) References Cited

FOREIGN PATENT DOCUMENTS

| | | |
|---|---|---|
| EP | 2 216 784 A1 | 8/2010 |
| JP | 63 113871 | 5/1988 |
| JP | 10 261271 | 9/1998 |
| JP | 2003 123333 | 4/2003 |
| WO | WO 03/063157 A1 | 7/2003 |
| WO | 2009 072305 | 6/2009 |

OTHER PUBLICATIONS

International Search Report issued Aug. 17, 2012 in PCT/JP10/003113 filed May 6, 2010.

Office Action issued Oct. 25, 2012 in European Patent Application No. 10 774 697.6.

Office Action issued Dec. 4, 2013, in Chinese Patent Application No. 201080019598.9 (with English-language Translation), 19 pages.

\* cited by examiner

FIG.1
1a
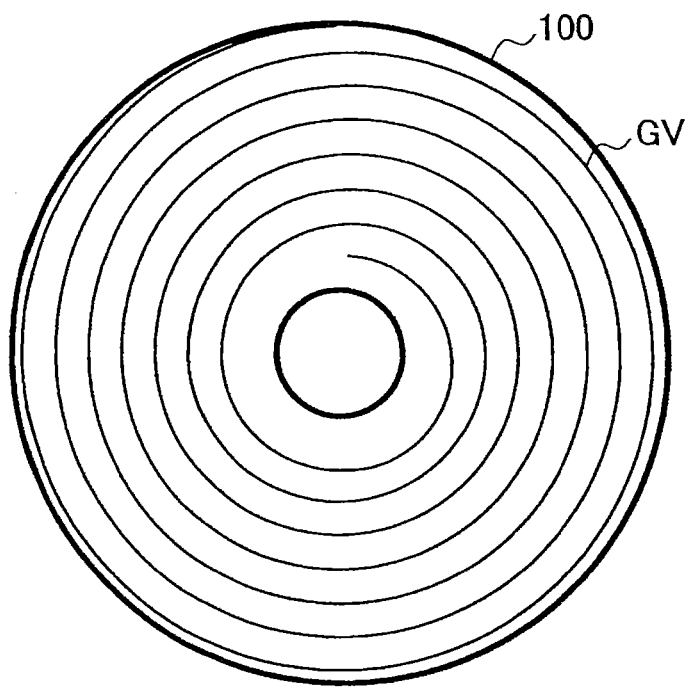
1b
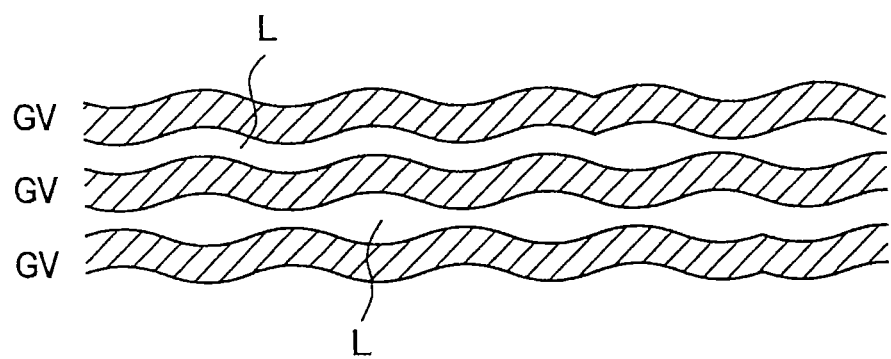

FIG.5
main data Frame structure
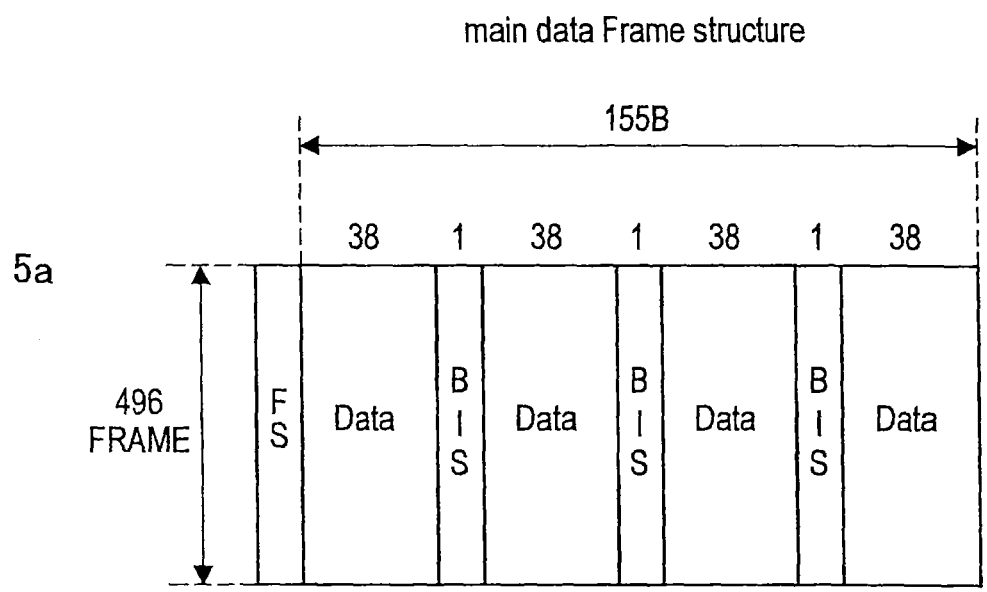
Wobble data Frame structure
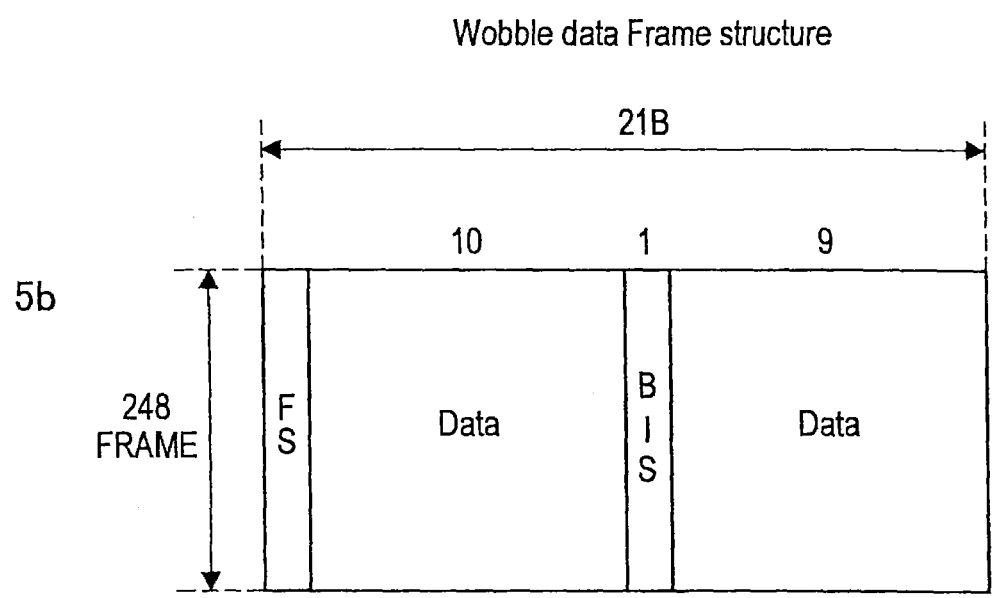

FIG.10
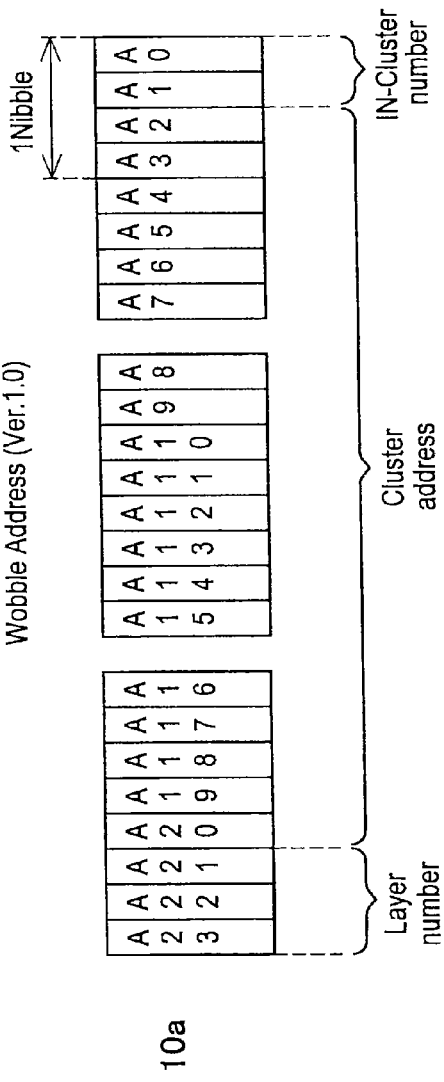
Wobble Address (Ver.1.0)
10a
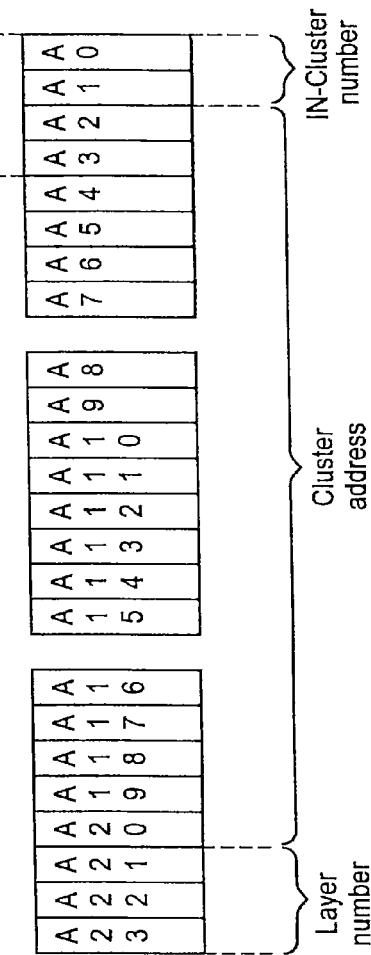
Wobble Address (Ver.2.0)
10b

MANUFACTURING METHOD FOR OPTICAL DISC, OPTICAL DISC, PLAYBACK METHOD FOR OPTICAL DISC, PLAYBACK APPARATUS FOR OPTICAL DISC, RECORDING APPARATUS FOR OPTICAL DISC

CROSS-REFERENCE TO RELATED APPLICATIONS

This application is a divisional of U.S. application Ser. No. 12/993,227, filed Nov. 17, 2010, the entire contents of which are hereby incorporated herein by reference. U.S. application Ser. No. 12/993,227 is a National Stage of PCT/JP10/003113 filed May 6, 2010, and claims priority under 35 U.S.C. 119 to Japanese Application No. 2009-114241 filed May 11, 2009 the entire contents of which are hereby incorporated herein by reference.

TECHNICAL FIELD

The present invention relates to a manufacturing method for an optical disc, an optical disc, a playback method for an optical disc, a playback apparatus for an optical disc, a recording apparatus for an optical disc.

BACKGROUND ART

Optical discs (including magneto optical discs) such as the Compact Disc (CD), the Mini-Disc (MD), the Digital Versatile Disc (DVD), the BLU-RAY Disc (registered trademark), and the like, for example, are known as recording media that record and play back digital data.

"Optical disc" is a generic name for a recording medium in the shape of a circular disc in which a thin metal plate is covered by plastic and from which a signal can be read by shining a laser beam onto the disc and reading the changes in the reflected beam.

SUMMARY OF INVENTION

In recent years, remarkable increases in capacity have been achieved by high-density recordings such as those seen on a Blu-ray Disc.

Among the current Blu-ray Discs, those with one recording layer and two recording layers are known, having recording capacities of approximately 25 gigabytes (GB) and 50 GB, and they are used for recording video content and application programs.

The use of high-density recording, multi-layer structures, and the like are being studied as ways to further increase the capacity of the Blu-ray Disc format.

However, various types of equipment specifications have established that are compatible with the current version of the Blu-ray Disc (hereinafter called the Ver. 1.0 disc), and there is concern that a new version will create problems with disc drive devices that are already commercially available (hereinafter called the Ver. 1.0 drives).

For example, if a new version of the Blu-ray Disc that incorporates a multi-layer structure of at least three layers (hereinafter called the Ver. 2.0 disc) becomes commercially available in the future, it could happen that a user would load a Ver. 2.0 disc into a Ver. 1.0 drive.

Basically, because the Blu-ray Disc format is the same, recording and playing back a Ver. 2.0 disc on a Ver. 1.0 drive would not be absolutely impossible. However, if the Ver. 2.0 disc is achieved by using higher density and more layers, it can be assumed that the various types of specifications with which the Ver. 1.0 drive is provided would not be adequate.

Therefore, in a case where recording and playback of a Ver. 2.0 disc are done on a Ver. 1.0 drive, there is concern that recording errors and playback errors would occur with greater frequency.

The present invention is made in view of the above-mentioned issue and makes recording and playback impossible of a Ver. 2.0 disc is loaded into a Ver. 1.0 drive. In other words, rather than being able to record and play back in an unacceptable way, the present invention renders the Ver. 2.0 disc incompatible with the Ver. 1.0 drive. Conversely, this increases the usability of the Blu-ray Disc system for the user.

According to the present invention as described above, the error correction encoded address information is recorded on the second version recording medium after being transformed such that the address decoding cannot be performed by a playback device that is not compatible with the second version of the recording medium. Therefore, the address decoding for the second version recording medium cannot be performed by the incompatible playback device (for example, a playback device that was manufactured to be compatible only with the first version of the recording medium).

In other words, the same error correction encoding processing is used for both the first version and the second version, but because the error correction encoded address information is transformed by the inverting of specific bits or the like, a state is created in which address errors cannot be corrected, so the address decoding becomes impossible. Because the address decoding cannot be done, even if the second version recording medium is loaded into the incompatible playback device, it can be put into a state in which it cannot be accessed (recording and playback are impossible).

According to the present invention, with the recording medium according to the present invention (the second version recording medium), it is possible to create a state in which the address decoding cannot be done, thus making recording and playback impossible, in the known recording device and the known playback device that are compatible only with the first version of the recording medium, which uses the same data format and the same error correction processing as the second version. Thus, even though the second version recording medium according to the present invention is the same type of recording medium as the first version, it is possible to make only the second version recording medium unusable in the known recording device and the known playback device, making it possible to avoid the occurrence of an unstable operating state. The usability of the entire system is therefore improved.

BRIEF DESCRIPTION OF DRAWINGS

FIG. 1 is an explanatory figure of a groove in a disc according to an embodiment of the present invention.

FIG. 5 is an explanatory figure of a frame structure according to the embodiment.

FIG. 10 is an explanatory figure of a wobble address according to the embodiment.

FIG. 14 is an explanatory figure of a setting of an inverse symbol position according to the embodiment.

DESCRIPTION OF EMBODIMENTS

Figure 2:
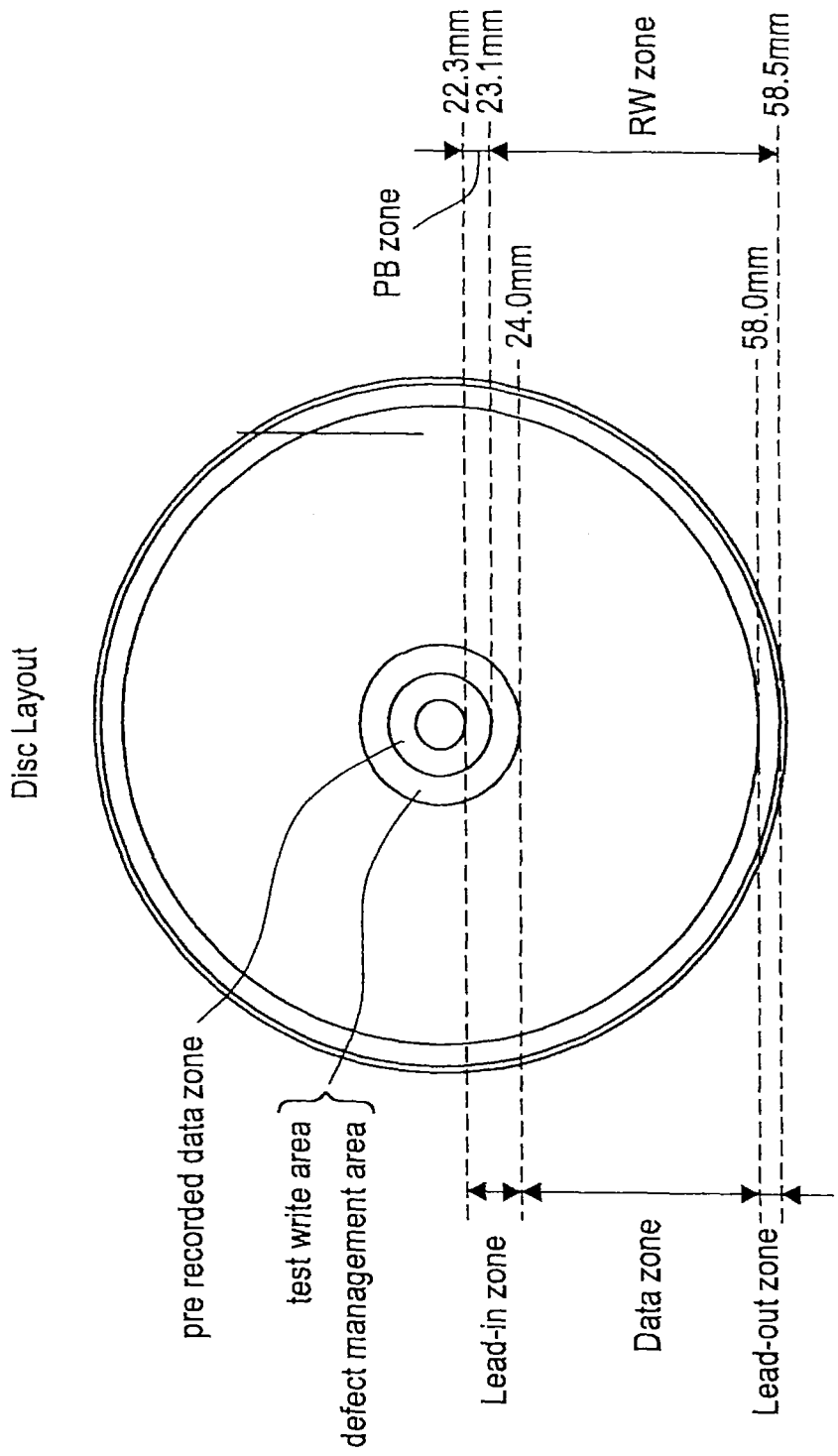
FIG. 2 is an explanatory figure of an area structure in the disc according to the embodiment.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

Hereinafter, an embodiment of the present invention will be explained in the order that is shown below.

1. Disc
2. Recording and playback of an address in the data
3. Recording and playback of wobble addresses
4. Disc drive device
5. Mastering device 1. Disc First, physical characteristics and wobbling tracks of a disc that is the present embodiment will be explained.

An optical disc in the present example belongs in the Blu-ray Disc category. The Blu-ray Disc in the present embodiment utilizes a data format in which address information is error correction encoded in the same manner as in the current Blu-ray Disc, and during playback, the error correction processing that is used is the same as that used for the current Blu-ray Disc.

Note that hereinafter, the current Blu-ray Disc that is referenced above will be called the Ver. 1.0 disc, and the Blu-ray Disc that corresponds to the disc according to the present embodiment will be called the Ver. 2.0 disc.

Further, the recording device and the playback device for the existing Blu-ray Disc are called the Ver. 1.0 drives. In accordance with this, a recording device and a playback device according to the present embodiment, that is, disc drive devices that are compatible with the Ver. 2.0 disc, are called Ver. 2.0 drives in some cases. First, the basic physical structure and data structure of the Blu-ray Disc will be described.

The Blu-ray Disc includes two types, a playback-only type that is known as a BD-ROM and a type that is capable of recording user data.

In the playback-only type, recording of information is performed using what are called embossed pit rows.

In the recordable type, the data can be recorded by using one of a pigment coating change recording method and a phase change recording method.

The pigment coating change recording method is also called a write once recording method, and it is preferable for data storage uses and the like, because the data can be written once and cannot be rewritten. In contrast, the phase change recording method allows the data to be rewritten and is used for various types of applications, starting with the recording of various types of content, such as music, video, games, application programs, and the like.

The diameter of the Blu-ray Disc is 120 millimeters. The disc thickness is 1.2 millimeters. That is, viewed from the outside, the Blu-ray Disc is the same as a Compact Disc (CD) and a Digital Versatile Disc (DVD) on these points.

The laser wavelength for recording and playback is 405 nanometers, and what is called a blue laser is used. The NA of the optical system is 0.85.

Tracks that are formed by the embossed pit rows and groove tracks in which pigment change marks and phase change marks are recorded have a track pitch of 0.32 micrometers and a line density of 0.12 micrometers.

Further, a user data capacity of approximately 23 to 25 GB per layer has been achieved.

In order to record data on a recordable disc by the pigment coating change recording method, the phase change recording method, or the like, a guidance method is required for performing tracking of data tracks. For this purpose, grooves are formed in advance as pre-grooves, and one of the grooves and lands (higher areas between the grooves) are defined as the data tracks.

Address information is required that makes it possible to record data at specified positions in the data tracks, and the address information is recorded by causing the grooves to wobble (waver).

As is shown schematically in FIG. 1-1*a*, a groove GV is formed on a disc 100 in a spiral shape from an innermost side to an outermost side. Note that in the case of a playback-only type disc, the groove is not formed, but a track is formed by an embossed pit row in this sort of spiral shape.

Furthermore, data recording and playback are performed while the disc is rotationally driven by a constant linear velocity (CLV) system, and the CLV applies to the groove GV as well. Therefore, the wobble wave number in the groove GV in a single circuit around the track increases as the tracking moves toward the outer edge of the disc.

As shown in FIG. 1-1*b*, a physical address in the groove GV is expressed by the forming of a wobble (a wavering). In other words, left and right side walls of the groove GV waver in accordance with a signal that is generated based on an address or the like.

An area between the groove GV and an adjacent groove GV is a land L, and the recording of the data that is described above is performed in the grooves GV. In other words, the grooves GV are the data tracks. Note that it is also conceivable that the land L can be used as the data track, with the recording of the data being performed in the land L, and that both the grooves GV and the land L can be used as the data tracks.

Forming the pre-grooves in advance as the tracks that will record the data in this manner and forming the wobbles in the side walls of the pre-grooves in accordance with the address information make it possible for the addresses to be read based on the wobble information that is obtained during recording and during playback in the form of reflected beam information. For example, a desired location can be accessed and data can be recorded and played back even if pit data or the like that indicate the addresses have not been formed on the disc in advance.

Note that the address information that is expressed in the grooves that wobble in this manner is called one of Absolute Time in Pre-groove (ATIP) and Address in Pre-groove (ADIP).

FIG. 2 shows a layout (a zone configuration) of the entire disc. Note that FIG. 2 shows an example of a recordable disc.

A lead-in zone, a data zone, and a lead-out zone are provided as zones on the disc, starting from the inner side.

Further, looking at the zone configuration in relation to recording and playback, the inner portion of the lead-in zone is designated as a PB zone (a playback-only zone), and the zone from the outer portion of the lead-in zone to the lead-out zone is designated as an RW zone (a recording and playback zone).

The lead-in zone is located in the inner portion of the disc, within a radius of 24 millimeters from the center. The area that is in the range of 22.3 to 23.1 millimeters from the center is designated as a pre-recorded data zone.

In the pre-recorded data zone, information (pre-recorded information) that is used for copy protection and the like is recorded in advance by making wobbles in the groove that is formed in a spiral shape on the disc. This is playback-only information that cannot be rewritten. In other words, the pre-recorded data zone is the PB zone (the playback-only zone) that is described above.

In the pre-recorded data zone, copy protection information, for example, may be recorded as the pre-recorded information, and the copy protection information may be used in performing the tasks described below, for example.

With the optical disc system according to the present example, a drive device maker and a disc maker who are registered can conduct business and have a media key and a drive key that indicate that they are registered.

One of the drive key and the media key is recorded as the copy protection information to protect against hacking. Media and drives that have the media key and the drive key can be rendered incapable of recording and playback by the copy protection information.

In the lead-in zone, a test write area and a defect management area are provided in the range of 23.1 to 24 millimeters from the center of the disc.

The test write area is used for test writing when conditions for recording and playing back the phase change marks, such as the laser power during recording and playback, for example, are set.

Information for managing information on defects on the disc is recorded in and played back from the defect management area.

The area in the range of 24.0 to 58.0 millimeters from the center of the disc is designated as the data zone. The data zone is the area in which the user data are recorded by the phase change marks and from which the user data are played back.

The area in the range of 58.0 to 58.5 millimeters from the center of the disc is designated as the lead-out zone. A defect management area of the same sort as that in the lead-in zone is provided in the lead-out zone, and during a seek, the defect management area is used as a buffer area to allow for overruns.

The area from 23.1 millimeters from the center of the disc, that is, from the test write area, to the lead-out zone is designated as the RW zone (the recording and playback zone), where the phase change marks are recorded and played back.

FIG. 2 also shows a burst cutting area (BCA) adjacent to a center hole. The BCA optionally includes information that may be written during mastering, so as to make the disc identifiable as a certain disc type. The BCA may also be individually written with a laser to "cut" information into a reflective layer of a finished disc. In the disc layout of FIG. 2, the BCA zone includes a flag, indicative of whether the disc is a one or two layer disc (single/dual disc), or a three or a four layer disc (triple/quad). The one or two layer disc is an exemplary earlier generation disc, while the three or four layer disc is an exemplary second or later generation disc. A playback device that first reads the BCA zone checks for the "layer flag" recorded in the BCA zone. If the flag is present, the disc is recognized as a three or four layer disc. This process is described in more detail with respect to FIG. 17. The example that is described above is a recordable type of disc, but the lead-in zone, the data zone, and the lead-out zone are also arranged in the same manner on a playback-only type disc. However, the test write area and the defect management area are not provided, and the entire disc is a playback-only zone in which the playback is based on embossed pits.

Next, error correcting code (ECC) structures for data that are recorded as main data in the form of phase change marks, embossed pits, or the like and for data that are recorded as the ADIP information in the form of wobbles in the tracks will be explained by FIG. 3, FIG. 4, and FIG. 5.

Note that the data that are recorded in the tracks in the form of one of phase change marks, pigment change marks, and embossed pit rows are called the main data, and are thus distinguished from the data that are recorded in the form of wobbles in the tracks, which are called wobble data. First, an ECC format for the main data (the user data) is shown in FIG. 3. Two codes, a long distance code (LDC) and a burst indicator subcode (BIS), are used as ECCs for the 64-kilobyte main data (2048 bytes per sector×32 sectors).

Figure 3:
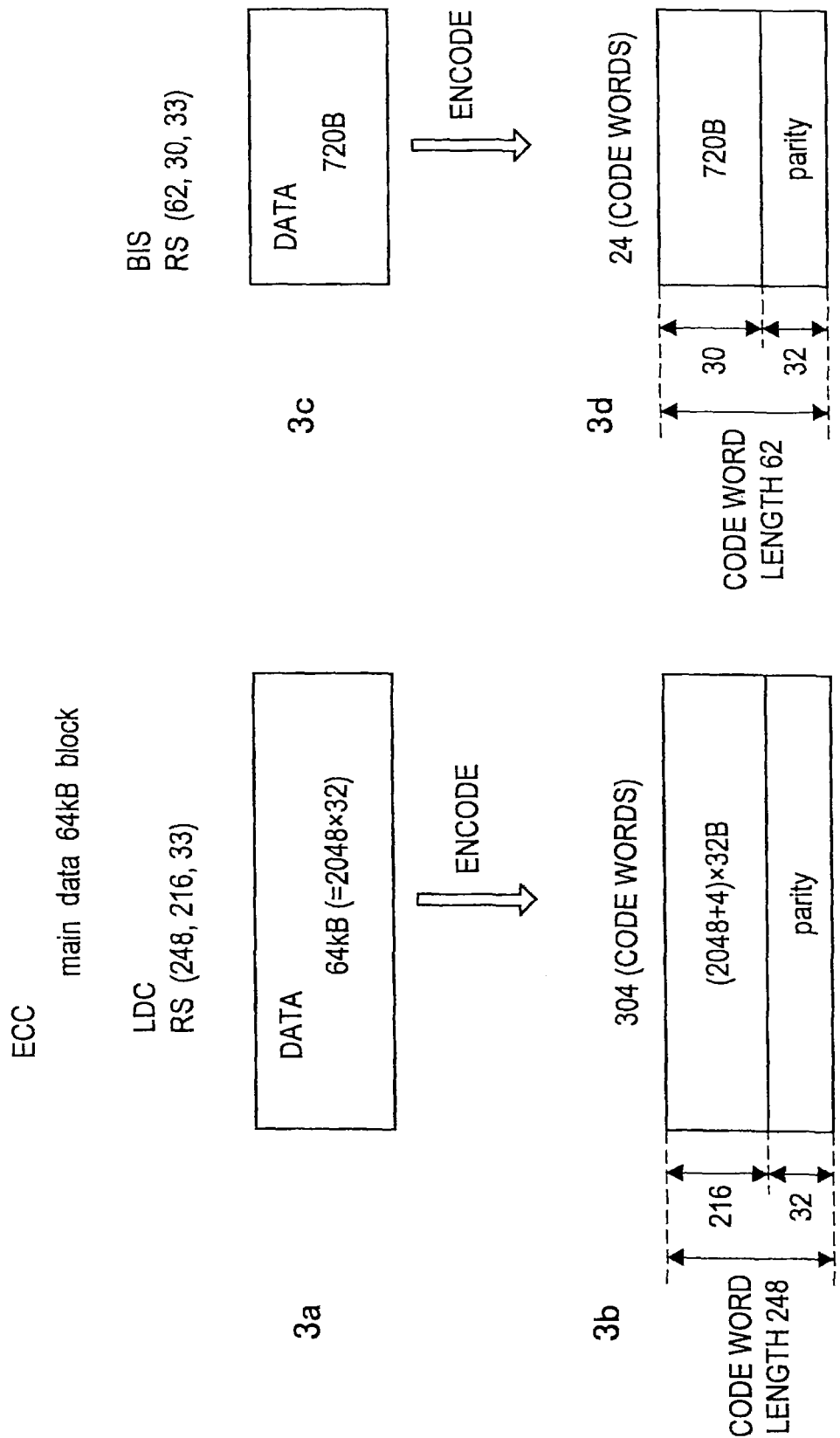
FIG. 3 is an explanatory figure of an ECC structure of main data according to the embodiment.

The 64-kilobyte main data that are shown in FIG. 3-3a are ECC encoded as shown in FIG. 3-3b. That is, a 4-byte error detection code (EDC) is appended to the 2048 bytes in each sector, and the LDCs are encoded for the 32 sectors. The LDCs are Reed-Solomon (RS) codes with RS (248, 216, 33), where the code word length is 248, the data length is 216, and the distance is 33. There are 304 code words.

In contrast, the BISs are ECC encoded as shown in FIG. 3-3d for the 720 bytes of data that are shown in FIG. 3-3c. That is, they are Reed-Solomon (RS) codes with RS (62, 30, 33), where the code word length is 62, the data length is 30, and the distance is 33. There are 24 code words.

A frame structure for the main data is shown in FIG. 5-5a.

The LDC data and the BISs described above configure the frame structure that is shown in the drawing. That is, a single frame is made up of 155 bytes, arranged as the data (38 bytes), the BIS (1 byte), the data (38 bytes), the BIS (1 byte), and the data (38 bytes). In other words, the single frame is configured as 152 bytes of data (32 bytes×4), with the 1-byte BIS inserted for every 38 bytes of the data.

A frame synchronization signal FS is placed at the beginning of the 155-byte frame.

There are 496 frames in one block.

In the LDC data, even-numbered code words 0, 2, and the like are placed in even-numbered frames 0, 2, and the like, while odd-numbered code words 1, 3, and the like are placed in odd-numbered frames 1, 3, and the like.

The BIS is a code that has far greater correcting capability than does the LDC code, and almost all errors are corrected. In other words, the code for which the distance is 33 is used for the code word length 62.

Therefore, a BIS symbol for which an error is detected can be used as described below.

When the ECC is decoded, the BIS is decoded first. In the frame structure that is shown in FIG. 5-5a, in a case where two errors occur between successive BISs or between a BIS and the frame synchronization signal FS, the 38 bytes of data that are bounded by the successive BISs or by the BIS and the frame synchronization signal FS are treated as a burst error. Error pointers are appended to the errors in the 38 bytes of data. With LDC, the error pointers are used for performing pointer erasure correction.

This makes it possible to increase the correcting capability by correcting with LDC only.

Address information and the like are included in the BIS. The address information is used in a case where address information is not available from the wobbling grooves, as with a ROM type disc or the like. Of course, the address information can also be used for retrieving an address during playback of a recordable disc.

Note that a recording unit block (a RUB), a recording and playback cluster that is the minimum unit of recording, is configured from 498 frames that include 496 frames of the ECC block of the main data that is shown in FIG. 5-5a, plus two link areas of one frame each appended at the beginning and the end for a PLL and the like.

Next, the ECC format for the wobble data in FIG. 4 will be described.

In this case, two codes, the long distance code (LDC) and the burst indicator subcode (BIS), are used as the ECCs for the 4-kilobyte data (2048 bytes per sector×2 sectors).

Figure 4:
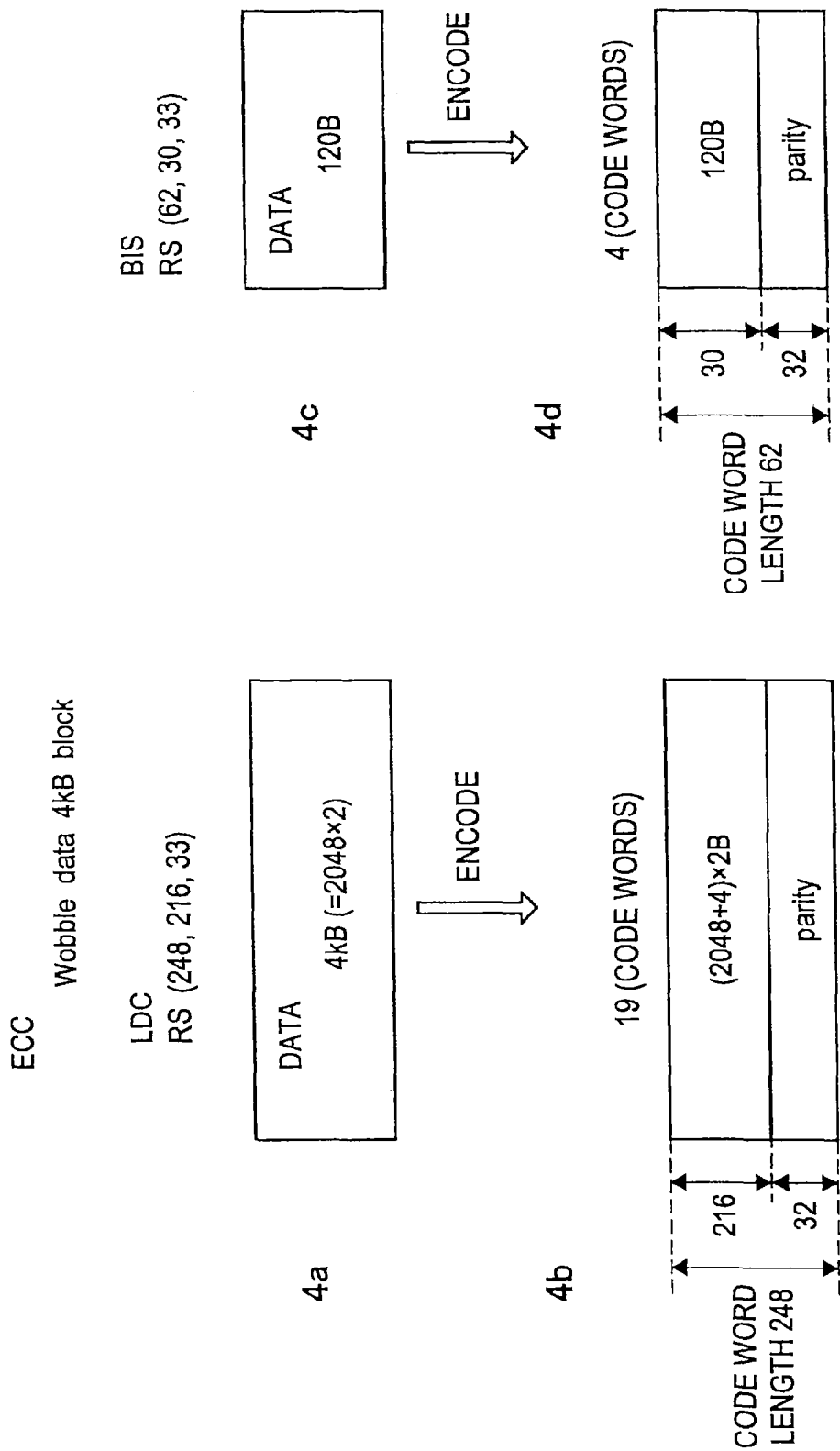
FIG. 4 is an explanatory figure of an ECC structure of pre-recorded information according to the embodiment.

The 4-kilobyte wobble data that are shown in FIG. 4-4a are ECC encoded as shown in FIG. 4-4b. That is, a 4-byte error detection code (EDC) is appended to the 2048 bytes in each sector, and the LDCs are encoded for the 2 sectors. The LDCs are Reed-Solomon (RS) codes with RS (248, 216, 33), where the code word length is 248, the data length is 216, and the distance is 33. There are 19 code words.

In contrast, the BISs are ECC encoded as shown in FIG. 4-4d for the 120 bytes of data that are shown in FIG. 4-4c. That is, they are Reed-Solomon (RS) codes with RS (62, 30, 33), where the code word length is 62, the data length is 30, and the distance is 33. There are 4 code words.

A frame structure for the wobble data is shown in FIG. 5-5b.

The LDC data and the BISs described above configure the frame structure that is shown in the drawing. That is, a single frame is made up of 21 bytes, arranged as the frame synchronization signal FS (1 byte), the data (10 bytes), the BIS (1 byte), and the data (9 bytes). In other words, the single frame is configured as 19 bytes of data, with the 1-byte BIS inserted.

The frame synchronization signal FS is placed at the beginning of the frame. There are 248 frames in one block.

In this case as well, the BIS is a code that has far greater correcting capability than does the LDC code, and almost all errors are corrected. Therefore, a BIS symbol for which an error is detected can be used as described below.

When the ECC is decoded, the BIS is decoded first. In a case where two errors occur between successive BISs or between a BIS and the frame synchronization signal FS, one of the 10 bytes of data and the 9 bytes of data that are bounded by the successive BISs or by the BIS and the frame synchronization signal FS are treated as a burst error. Error pointers are appended to the errors in the one of the 10 bytes of data and the 9 bytes of data. With LDC, the error pointers are used for performing pointer erasure correction.

This makes it possible to increase the correcting capability by correcting with LDC only.

Figure 6:
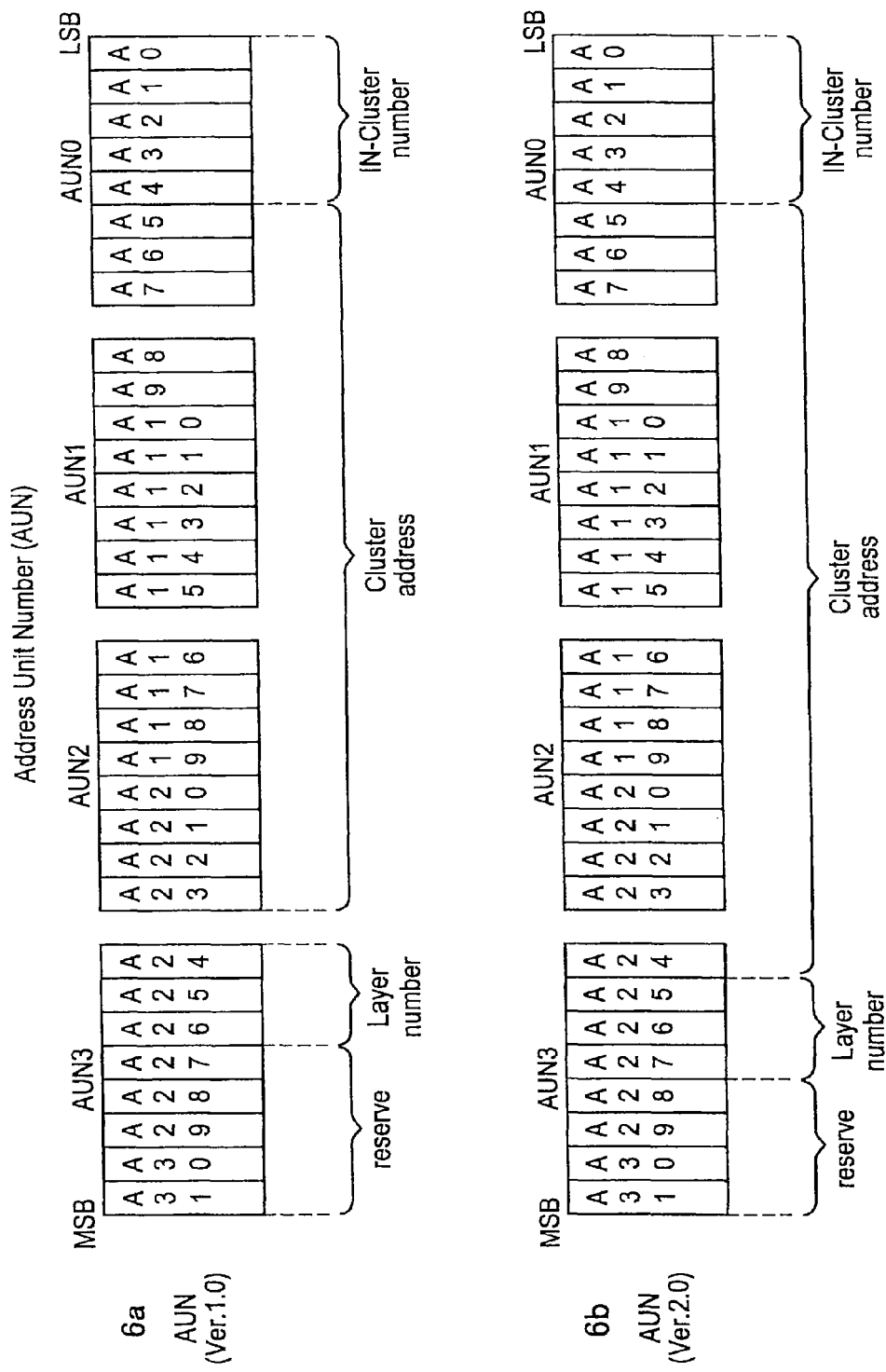
FIG. 6 is an explanatory figure of an address in data according to the embodiment.

As can be seen from FIG. 5 and FIG. 6, the same codes and structures are used as the ECCC format for both the data in the form of the phase change marks and for the pre-recorded information.

This means that the ECC decoding processing for the pre-recorded information can be performed by the circuit system that performs the ECC decoding processing during the playback of the data in the form of the phase change marks, so a more efficient hardware configuration can be used as the disc drive device.

2. Recording and Playback of an Address in the Data

Recording and playback of an address in the data on the disc (the Ver. 2.0 disc) in the present example will be explained. The address in the data is the address information that is included in the BIS in the ECC block structure of the main data that is shown in FIG. 3 and FIG. 5-5a.

FIG. 6-6a and 6b show address unit number (AUN) structures in the Ver. 1.0 disc and the Ver. 2.0 disc (the disc according to the present embodiment).

First, as shown in FIG. 6-6a, in the Ver. 1.0 disc, a four-symbol AUN (in which one symbol is eight bits) is formed by AUN0 to AUN3. The four symbols are indicated by bits A0 to A31.

The five bits A0 to A4 are an in-cluster number. The cluster is the structural unit of the recording unit block (the RUB), the recording and playback cluster that is the unit of data recording.

The nineteen bits A5 to A23 are a cluster address.

The three bits A24 to A26 are a layer number (the number of the recording layer).

The bits A27 to A31 are reserved.

In contrast, the AUN structure for the Ver. 2.0 disc is as shown in FIG. 6-6b.

Within the bits A0 to A31 that serve as AUN0 to AUN3 of the four symbols, the five bits A0 to A4 are the in-cluster number.

The twenty bits A5 to A24 are the cluster address.

The three bits A25 to A27 are the layer number.

The bits A28 to A31 are reserved.

In other words, the number of cluster address bits has been increased to twenty in accordance with the increase in the total number of clusters that is due to the increase in capacity.

Figure 7:
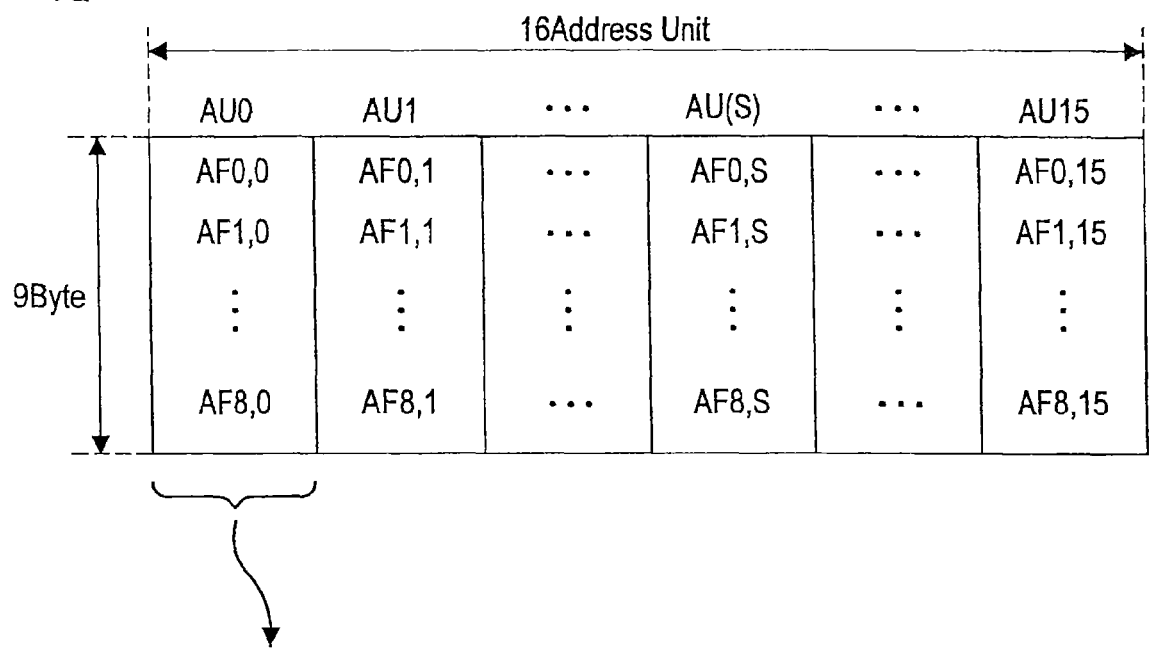
FIG. 7 is an explanatory figure of an ECC structure of the address in the data according to the embodiment.

The error correction encoding (the ECC encoding) of the address information is performed in units of the address units that are shown in FIG. 7.

FIG. 7-7a shows the address units AU0 to AU15, each of which is nine bytes.

The address unit AU0 is configured from address fields AF0,0 to AF8,0.

The address unit AU1 is configured from address fields AF0,1 to AF8,1.

Each of the address units up to AU15 is configured from nine bytes in the same manner.

A single address field AF is one byte (one symbol).

The ECC encoding is performed in units of the nine-byte address units. The address unit AU contains the AUNs that are shown in FIG. 6, plus parity bytes.

For example, if the address unit AU0 is used as an example, it is configured as shown in FIG. 7-7b.

The address unit numbers AUN3, AUN2, AUN1, and AUN0 are respectively allocated to the address fields AF0,0, AF1,0, AF2,0, AF3,0 in the address unit AU0.

The address field AF4,0 is used as a flag bit.

The parity bytes (Parity3 to Parity0) are allocated to the address fields AF5,0 to AF8,0.

Because four symbols among the nine symbols have parity, the error correction that uses the ECC encoding in units of the address units has the capability to correct errors in up to two symbols.

The error correction encoded data that have already been formed as the address units are RS codes with RS (9, 5, 5), where the code word length is 9, the data length is 5, and the distance is 5.

Figure 8:
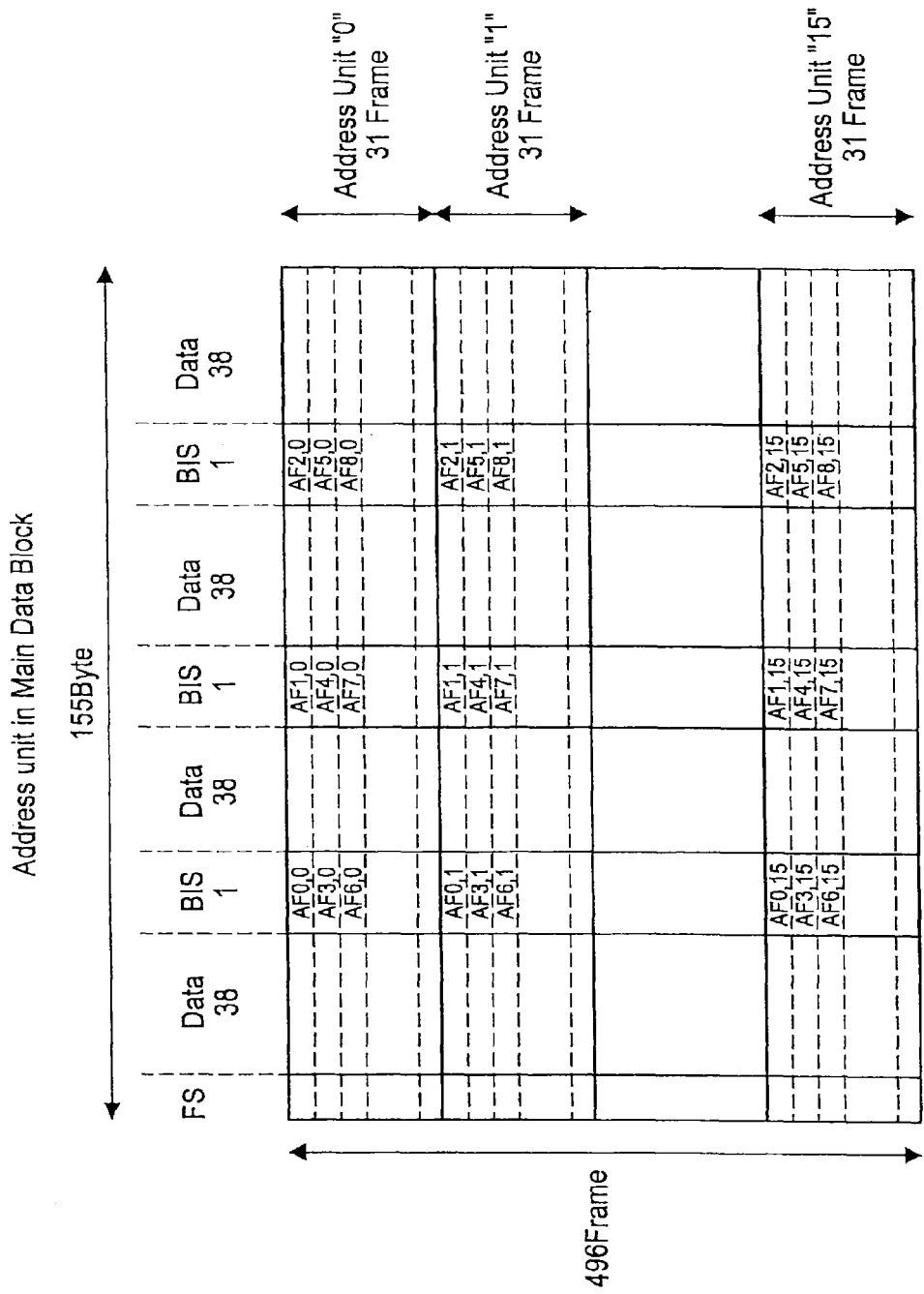
FIG. 8 is an explanatory figure of a BIS structure according to the embodiment.

The arrangement of the address units within the main data block is shown in FIG. 8.

The main data block is the one that is shown in FIG. 5-5a.

Within the 496 frames of the main data block, the address units are divided into units of 31 frames each by the BISs.

The BISs for one frame occupy three bytes, so the BISs for 31 frames occupy 93 bytes, but the address units are placed in the first nine bytes of the 93 bytes. Control data and the like are placed in the remaining BIS bytes.

As shown in FIG. 8, the address fields AF0,0 to AF8,0 that configure the address unit AU0 are placed in the nine BIS bytes in the first unit of 31 frames.

Further, the address fields AF0,1 to AF8,1 that configure the address unit AU1 are placed in the nine BIS bytes in the second unit of 31 frames.

Thereafter, the address units AU2 to AU15 are placed in the BIS bytes in each unit of 31 frames in the same manner.

The BISs that are described above have a strong correcting capability, but the error correction for the address units is performed in units of the address units. This is done because with correction using the BIS block that is shown in FIG. 3-3d, the address decoding, for which speed is necessary, is too slow.

Therefore, the capability to correct the address information is dependent on the capability to correct the address unit AU, so it is possible to correct up to two symbols, as described above.

To put it another way, errors in more than two symbols cannot be corrected. Moreover, if errors occur in more than two symbols, the address cannot be decoded.

In the present embodiment, the Ver. 2.0 disc is made such that it cannot be recorded and played back in the Ver. 1.0 drive. Making it impossible to decode the address is a good way to make it impossible to record and play back the Ver. 2.0 disc in the Ver. 1.0 drive. That is because the disc cannot be accessed for recording and playback if the address information cannot be decoded.

Accordingly, the recording and the playback of the address information that is ECC encoded as the address unit AU that is described above are performed by processing like that described below.

When information is recorded on the Ver. 2.0 disc in the present example, the error correction encoding of the address information is first performed using the same error correction encoding as that used for the Ver. 1.0 disc. In other words, the error correction encoding is performed in units of the address units AU that are shown in FIG. 7.

However, the address information is not allocated in its existing form to the BISs in the main data block in FIG. 8. Some of the nine symbols (the nine address fields) of the address unit AU are transformed. Specifically, one of all and some of the bits in specified symbols are inverted. Then the error correction encoded data (the address units) in which some of the bits have been inverted are allocated to the BISs as shown in FIG. 8 to form the main data block, which is then recorded.

For its part, the Ver. 2.0 drive (the playback device according to the present embodiment) that is compatible with the Ver. 2.0 disc is also compatible with the transformation processing that is described above, so the Ver. 2.0 drive performs restoration processing that is the opposite of the transformation processing that inverted the bits. For example, the original address field may be restored by performing bit inversion again in the positions where the inverted bits are located. The error correction decoding is then performed in units of the address units AU that are configured from the restored address fields.

Figure 9:
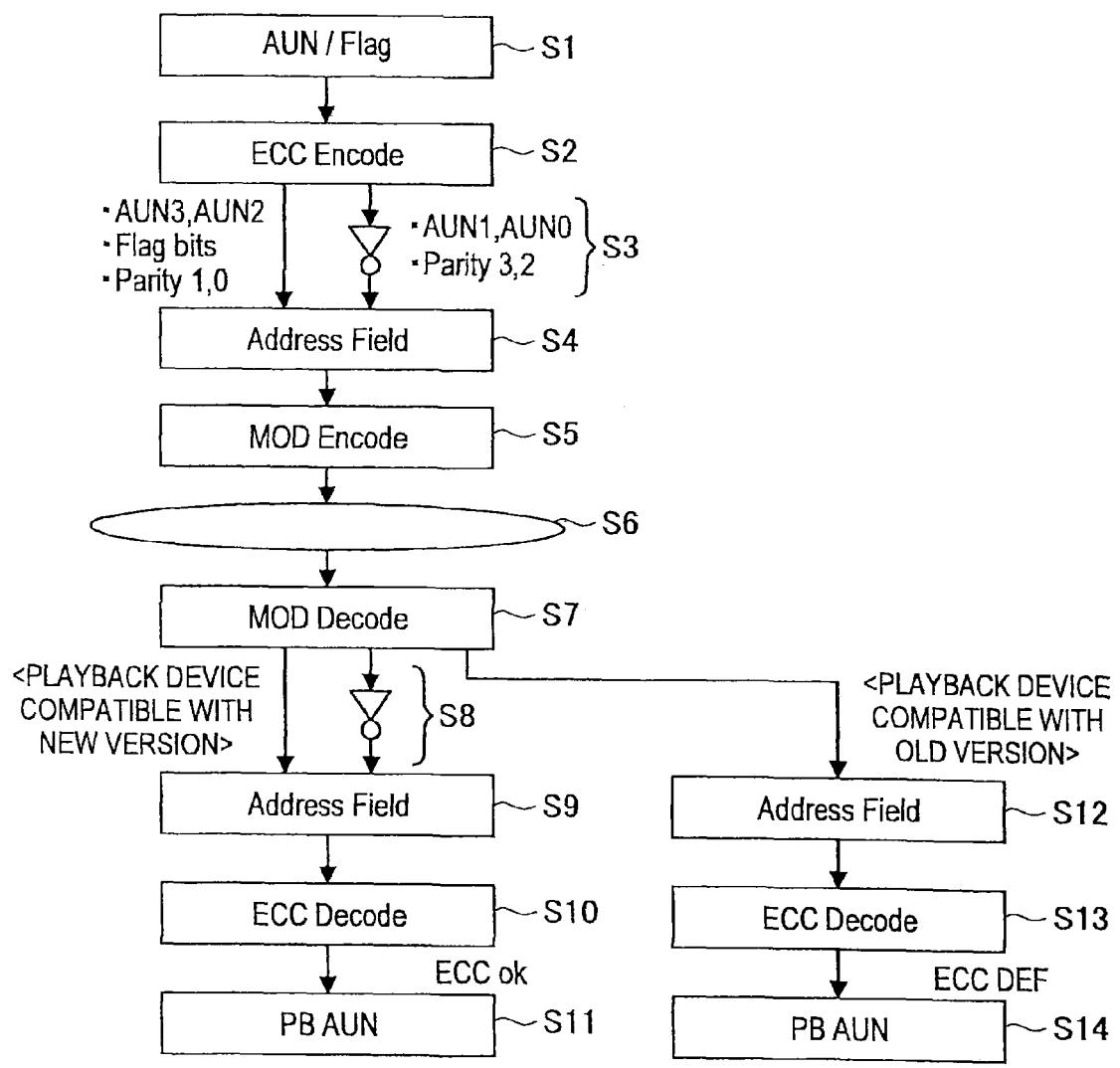
FIG. 9 is an explanatory figure of recording and playback of the address in the data according to the embodiment.

The flow of address processing in a case where the recording is done on the Ver. 2.0 disc in the present example and the playback is done on the Ver. 2.0 disc is shown in FIG. 9.

The processing at Steps S1 to S6 indicates the flow up to where the data are recorded on the Ver. 2.0 disc.

The processing at Step S1 generates the address unit numbers (AUN0 to AUN3) and the flag data that are to be recorded. The processing at Step S2 performs the ECC encoding. That is, the four parity symbols (Parity3 to Parity0) are generated for the five symbols of AUN0 to AUN3 and the flag data that were generated in the processing at Step S1. In other words, nine symbols are produced in order to form the address unit AU.

The processing at Step S3 performs the transformation processing for the symbols. Of the nine symbols, the bit inversion processing at this step is performed for the four symbols AUN0, AUN1, Parity3, and Parity2. Note that the bit inversion for the symbols may invert all of the eight bits that form the symbols and may also invert only a specified subset of the bits.

In contrast, the inversion processing is not performed for the five symbols of AUN2, AUN3, the flag bits, Parity1, and Parity0.

The processing at Step S4 performs the forming of the address fields.

That is, the address unit AU that is shown in FIG. 7-7a is formed by allocating AUN0, AUN1, Parity3, and Parity2, which have been inverted, and AUN2, AUN3, the flag bits, Parity1, and Parity0, which have not been inverted, to the address fields AF0 to AFB, as shown in FIG. 7-7b.

The processing at Step S5 performs the encoding that forms the recorded data (the modulated data). In the case of the Blu-ray Disc, the modulation method that is used is an RLL (1, 7) PP modulation method (where RLL means "run length limited", and PP means "Parity preserve/Prohibit RMTR (repeated minimum transition run length)").

The address information in the address units AU0 to AU15 in FIG. 7 is arranged in the main data block as shown in FIG. 8. The data stream that configures the main data block is RLL (1, 7) PP modulated.

The processing at Step S6 performs the data recording on the disc (the Ver. 2.0 disc) by emitting a laser beam in accordance with the modulated data.

The processing at Steps S1 to S6 above is performed by the Ver. 2.0 drive (the recording device) according to the present embodiment.

If the disc is the recordable type, for example, the processing of the addresses that is described above is performed during the recording in the Ver. 2.0 drive that is the recording device.

Further, in a case where it is assumed that the disc is the playback-only type, the processing of the addresses that is described above is performed in a mastering process for a master disc (described later). In that case, a mastering device that will be described later serves as the recording device that is the Ver. 2.0 drive according to the present embodiment.

The processing at Steps S7 to S11 shows the address processing in a case where the Ver. 2.0 disc for which the recording that is described above has been performed is played back on the Ver. 2.0 drive (the playback device according to the present embodiment).

The processing at Step S7 performs the demodulation of the information that is read from the Ver. 2.0 disc. In other words, the RLL (1, 7) PP modulated data are demodulated.

Starting with the address information, this processing produces the data for each of the address fields that configure the address units AU0 to AU15 in FIG. 7-7a.

However, the bit inversion processing has been performed for the data in the specified address fields by the transformation processing at Step S3 during the recording.

Accordingly, the processing at Step S8 performs the restoration processing.

Of the nine symbols that configure the address unit AU, the bit inversion processing at this step is performed for the four symbols AUN0, AUN1, Parity3, and Parity2. In other words, the bits that were inverted by the processing at Step S3 are inverted once again to restore them to their original symbol values.

On the other hand, the five symbols of AUN2, AUN3, the flag bits, Parity1, and Parity0 were not inverted by the processing at Step S3, so the bit inversion processing at this step is not performed for them.

The restoration processing yields the data for the original address fields.

The processing at Step S9 produces AUN0 to AUN3, the flag data, and Parity0 to Parity3 as the data for the restored address fields. In other words, it produces the nine symbols of the address unit AU.

The processing at Step S10 performs the error correction decoding for the address unit AU. In this case, the error correction decoding is performed for the data for the address unit that were ECC encoded in the processing at Step S2 and were restored by the restoration processing at Step S8. Therefore, normal error correction decoding is performed, and the address information (AUN0 to AUN3) is correctly decoded in the processing at Step S11.

This makes it possible for the addresses in the data to be read appropriately by the Ver. 2.0 drive during the playback of the Ver. 2.0 disc. Therefore, ordinary playback access and recording access can be performed using the addresses in the data, so the playback operation and the recording operation can be performed properly.

On the other hand, the processing at Steps S7 and S12 to S14 shows the address processing in a case where the Ver. 2.0 disc for which the recording that is described above has been performed is played back on the Ver. 1.0 drive (the known playback device).

The processing at Step S7 performs the demodulation of the information that is read from the Ver. 2.0 disc. In other words, the RLL (1, 7) PP modulated data are demodulated.

Starting with the address information that is thus produced, the processing at Step S12 produces the data for each of the address fields that configure the address units AU0 to AU15 in FIG. 7-7a.

However, the bit inversion processing has been performed for the data in the specified address fields (the address fields that correspond to AUN0, AUN1, Parity3, and Parity2) by the transformation processing at Step S3 during the recording. The inverted data in each of the address fields are next provided to the error correction decoding in the processing at Step S13.

When the error correction decoding is performed for each of the address units AU, some of the data in the address fields that configure the address units AU have values that are different from what they were when the ECC encoding was performed (in the processing at Step S2). In the case of the address unit AU0, the address fields AF2,0, AF3,0, AF5,0, and AF 6,0 that correspond to AUN0, AUN1, Parity3, and Parity2 have symbol values that that are the results of the bit inversion by the transformation processing.

Although the address unit AU has the capability to correct errors in up to two symbols, as was described earlier, in this case, a state exists in which errors have occurred in four symbols.

Therefore, the result of the error correction is a decode failure (DF), a failure to correct the errors.

In other words, the address information (AUN0 to AUN3) cannot be correctly decoded by the processing at Step S14.

Thus, during the playback of the Ver. 2.0 disc by the Ver. 1.0 drive, the addresses in the data cannot be read properly. Therefore, ordinary playback access and recording access cannot be performed, so error processing is performed, and the playback operation and the recording operation are not started.

In other words, it is possible to make it impossible to record and play back the Ver. 2.0 disc on the Ver. 1.0 drive.

In the case of the playback-only type of the Ver. 2.0 disc, the grooves do not exist, so making it impossible to read the addresses in the data, as described above, makes it possible to render playback impossible on the Ver. 1.0 drive.

In the case of the recordable type of the Ver. 2.0 disc, even though the addresses in the data cannot be read, recording and playback are possible, because the wobble addresses can be read. Therefore, the wobble addresses are also rendered unreadable by the Ver. 1.0 drive, as will be described next.

Note that in the example in FIG. 9, in the transformation processing at Step S3, the bit inversion is performed for four symbols among the nine symbols that configure the address unit AU. In the present example, the capability to correct the address unit AU is such that errors in more than two symbols cannot be corrected, so in the processing at Step S3, it is satisfactory if the bit inversion processing is performed for at least three symbols.

Further, in a case where the bit inversion is performed for four symbols, for example, the objects of the processing are not limited to AUN0, AUN1, Parity3, and Parity2. However, as in the present example, it is believed to be desirable for two address information symbols and two parity symbols to be inverted to eliminate bias. Of course, in a case where the inversion processing is performed for four symbols, an example in which the inversion processing is performed for four symbols in the address, an example in which the inversion processing is performed for the flag bits, and the like are conceivable.

Furthermore, for the address information, it is believed to be appropriate for the bit inversion to be performed for the lower order symbols. This is because drives exist that do not do the ECC decoding of the addresses, and in those sorts of drives, the addresses are not incremented, so errors can occur.

Of course, an example in which the higher order symbols AUN2, AUN3 in the address information are the objects of inversion is also conceivable.

3. Recording and Playback of Wobble Addresses

Next, recording and playback of the wobble addresses on the disc (the Ver. 2.0 disc) in the present example will be explained.

FIG. 10-10a and 10b show the wobble address structures in the Ver. 1.0 disc and the Ver. 2.0 disc (the disc according to the present embodiment).

First, as shown in FIG. 10-10a, the wobble address on the Ver. 1.0 disc is configured from the 24 bits A0 to A23. Note that in the wobble address, four bits are treated as one symbol, but the four-bit symbol is hereinafter called a nibble. The 24-bit wobble address includes six nibbles.

The two bits A0, A1 are the in-cluster number.

The nineteen bits A2 to A20 are the cluster address.

The three bits A21 to A23 are the layer number.

In contrast, the wobble address structure in the case of the Ver. 2.0 disc is as shown in FIG. 10-10b.

Of the bits A0 to A23 in the six nibbles, the two bits A0, A1 are the in-cluster number.

The twenty bits A2 to A21 are the cluster address. The number of cluster address bits has been increased to twenty in accordance with the increase in the total number of clusters that is due to the increase in capacity.

The two bits A22 to A23 are the layer number.

In the present example, three addresses are included as the ADIP addresses for the recording unit block (the RUB), the recording and playback cluster that is the unit of data recording.

Figure 11:
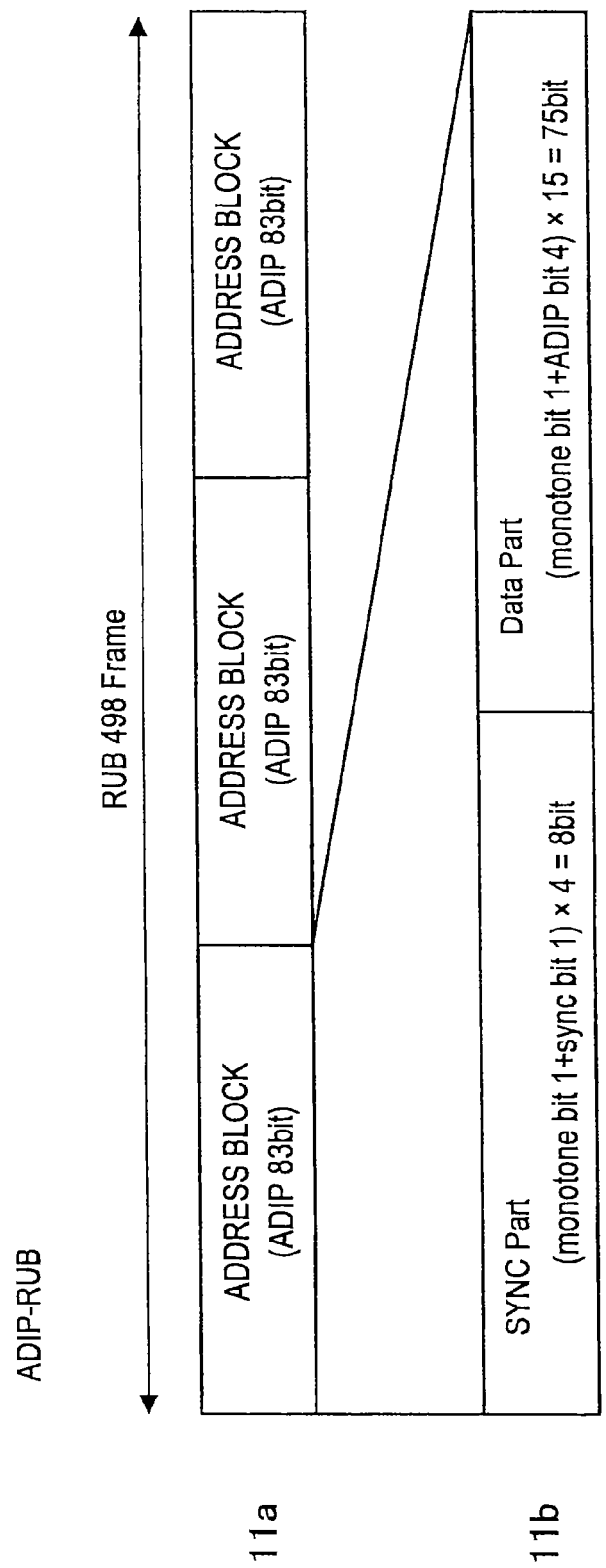
FIG. 11 is an explanatory figure of an address block for a RUB according to the embodiment.

FIG. 11 shows the RUB. The RUB (the recording and playback cluster) is the unit of recording and playback is configured from 498 frames that include the 496 frames of the ECC block of the data that is shown in FIG. 5-5a, plus two link areas of one frame each appended at the beginning and the end for a PLL and the like.

As shown in FIG. 11-11a, three ADIP address blocks are contained in interval that corresponds to the one RUB.

A single address block is formed from 83 bits.

FIG. 11-11b shows the configuration of the single address block. The 83-bit address block includes an eight-bit sync part (a synchronization signal part) and a 75-bit data part.

The eight bits of the sync part are divided into four sync blocks, each of which is formed from a monotone bit (one bit) and a sync bit (one bit).

The 75 bits of the data part are divided into fifteen ADIP blocks, each of which is formed from a monotone bit (one bit) and ADIP bits (four bits).

The monotone bits, the sync bit, and the ADIP bits are formed from wobbles in intervals of 56 wobbles. A minimum shift keying (MSK) mark is placed at the beginning of each of the bits for bit synchronization.

In each of the monotone bits, the MSK mark is followed by a series of wobbles that are formed consecutively in accordance with a carrier frequency. In the sync bit and each of the ADIP bits, the MSK mark is followed by wobbles that are formed according to an MSK modulation waveform and a saw tooth wobble (STW) modulation waveform.

The address information is recorded using sixty bits that are made up of the fifteen blocks of the ADIP bits (four bits) of the data part.

Figure 12:
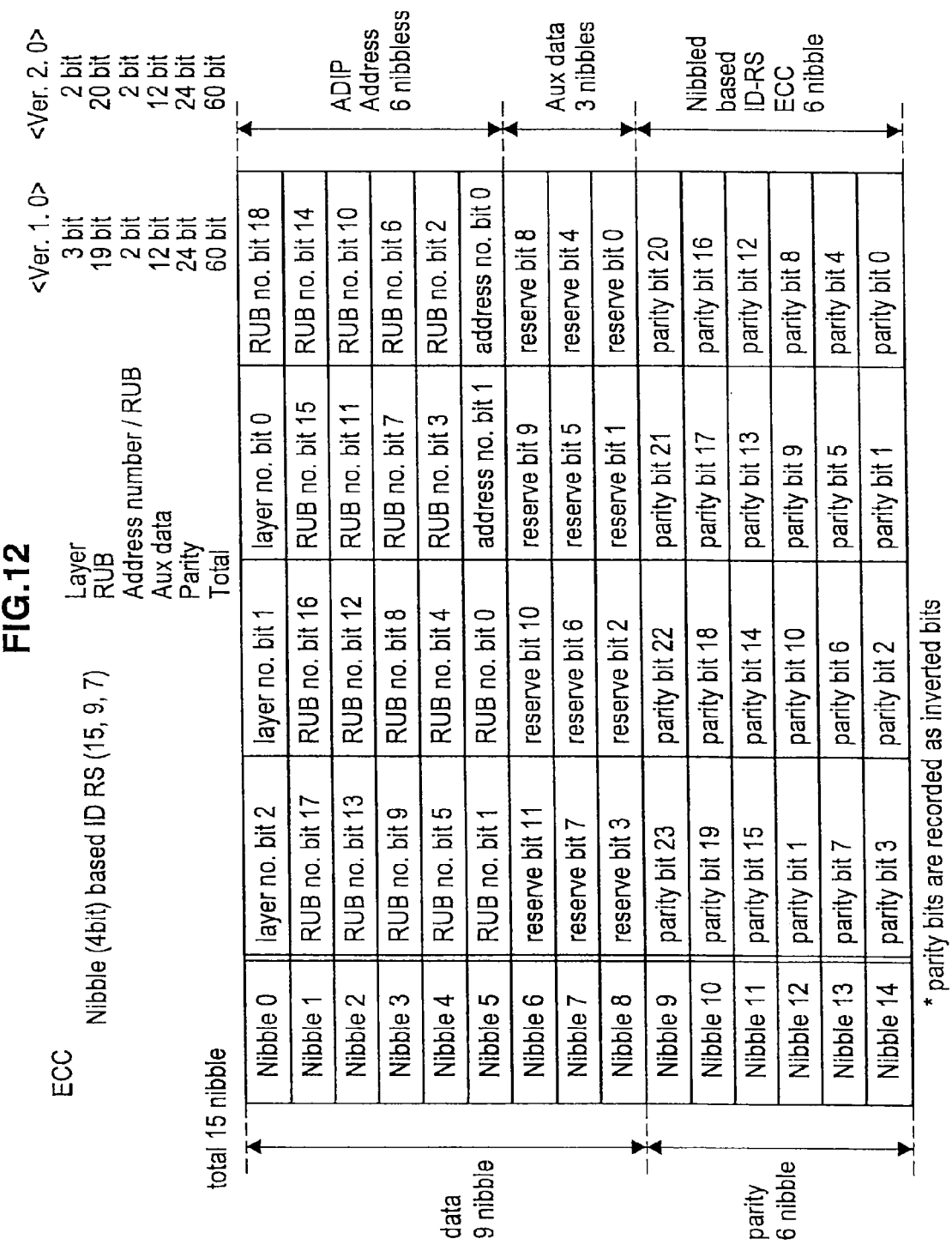
FIG. 12 is an explanatory figure of an ECC structure of ADIP information according to the embodiment.

The address format (the error correction block structure) that is formed from the sixty bits is shown in FIG. 12. The ECC unit that serves as the address data is thus a unit with a total of sixty bits, configured from the fifteen nibbles Nibble0 to Nibble14 (one nibble is four bits), as shown in FIG. 12. The error correction block structure includes nine nibbles (36 bits) of data, with six nibbles (24 bits) of parity information appended to them.

Within the nine nibbles (36 bits) of data, the six nibbles (24 bits) Nibble0 to Nibble5 are used as the ADIP address information, that is, as the 24-bit wobble address that is shown in FIG. 10.

The three nibbles (12 bits) Nibble6 to Nibble8 are used for auxiliary data, such as a disc ID and the like, in which recording conditions such as the recording and playback laser power and the like are stored.

The 24 bits in Nibble9 to Nibble14 are used for parity checking.

The error correction method is a nibble-based Reed-Solomon code with RS (15, 9, 7), for which one nibble is four bits. In other words, the code word length is 15 nibbles, the data length is nine nibbles, and the parity length is six nibbles.

In FIG. 12, Nibble0 to Nibble5 include three bits for the layer address, twenty bits for the RUB number (the cluster address), and two bits for the address number (the in-cluster address), but this format is for the Ver. 1.0 disc that is shown in FIG. 10-10a.

For the Ver 2.0 disc that is shown in FIG. 10-10b, the corresponding 24 bits are made up of two bits for the layer address, 21 bits for the RUB number (the cluster address), and two bits for the address number (the in-cluster address).

Figure 13:
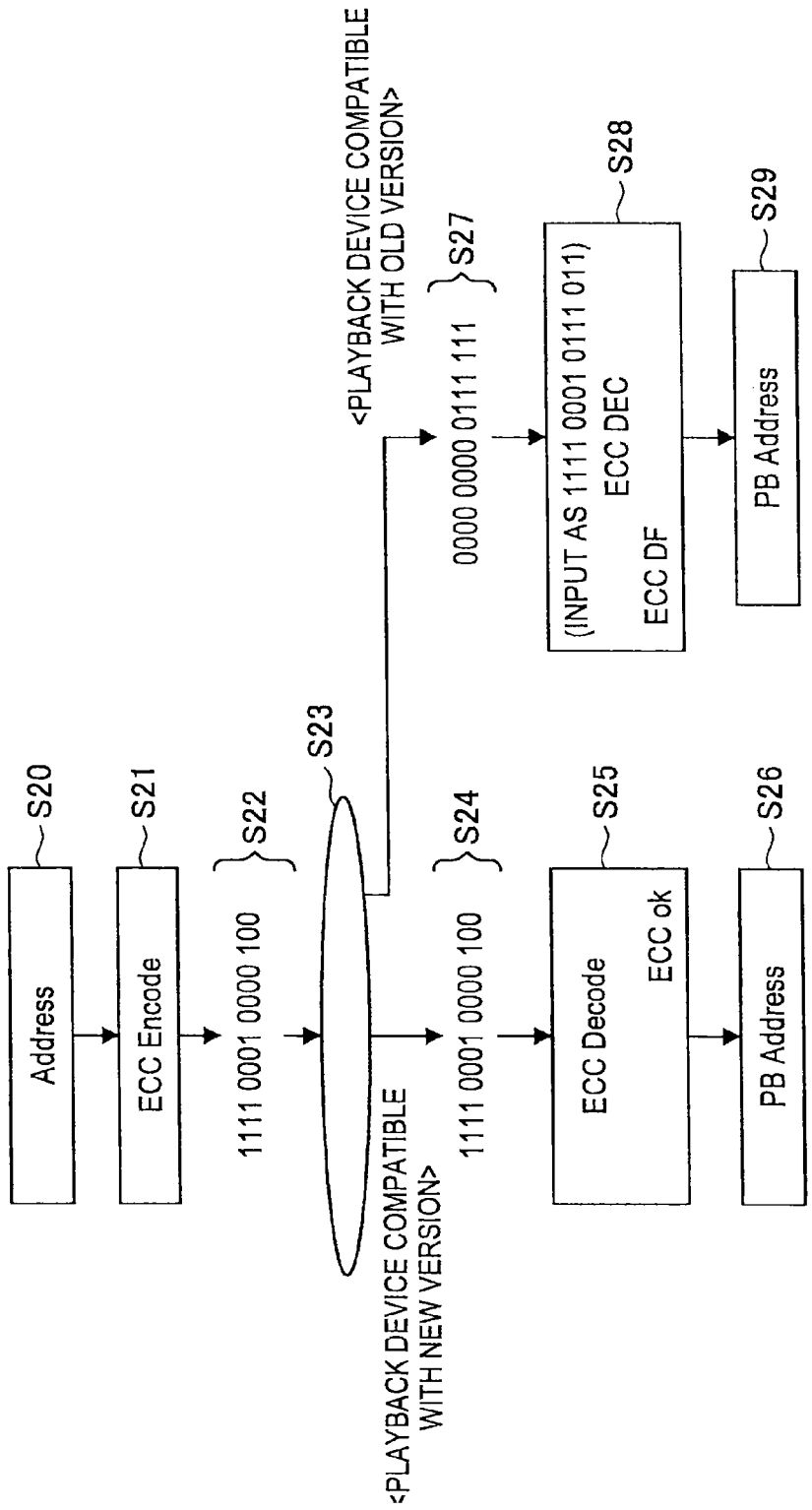
FIG. 13 is an explanatory figure of recording and playback of the wobble address according to the embodiment.

FIG. 13 shows a flow of address processing in a case where

The flow of the address processing in a case where the recording is done on the Ver. 2.0 disc in the present example and the playback is done on the Ver. 2.0 disc is shown in FIG. 13.

The processing at Steps S20 to S21 indicates the flow up to where the wobble addresses are recorded on the Ver. 2.0 disc. Note that what is called the recording of the wobble addresses occurs when the wobbling grooves are formed in the mastering process for the master disc. Therefore, the recording device in this case is the mastering device.

The processing at Step S20 generates the address data that are to be recorded. In other words, the 24 bits (six nibbles) for the wobble address in FIG. 10-10b are generated.

The processing at Step S21 performs the ECC encoding. That is, the three nibbles of auxiliary data and the six nibbles of the parity information are generated for the six nibbles of the wobble address that were generated in the processing at Step S20. In other words, error correction encoded data having the structure that is shown in FIG. 12 are produced.

The processing at Step S22 performs the transformation processing for the nibbles.

The error correction encoded data as shown in FIG. 12 include fifteen nibbles (Nibble14 to Nibble0). The bit inversion processing is performed for nibbles at specified positions within the fifteen nibbles. Note that the bit inversion for any one nibble may invert all four of the bits in the nibble, and may also invert only a specified subset of the bits.

In FIG. 13, "111100100000100" is shown at Step S22.

Here, a 1 indicates that the bit inversion processing will be performed, and a 0 indicates that the bit inversion processing will not be performed, with each of the positions corresponding to one of the fifteen nibbles. In other words, "111100100000100" shows whether or not the bit inversion processing will be performed for each of the fifteen nibbles (Nibble14 to Nibble0).

In this case, the bit inversion processing will be performed for Nibble14, Nibble13, Nibble12, Nibble11, Nibble7, and Nibble2, which correspond to the 1's, and the bit inversion processing will not be performed for the other nibbles.

The recording on the disc is performed in the processing at Step S23. In this case, the mastering (the cutting of the master disc) is performed based on the ADIP information after the processing at Step S22, and the formation of the wavering wobbling grooves (by exposure to light) in the master disc is performed based on a modulated signal of the ADIP information.

Thereafter, the developing of the master disc image, the creation of a stamper, and the manufacturing of the disc using the stamper are performed, although these will be described later.

The disc that is manufactured is a recordable type of the Ver. 2.0 disc.

Steps S24 to S26 show the address processing that is performed for the Ver. 2.0 disc in which the wobbling grooves have been formed, as described above, when one of recording and playback is done on the Ver. 2.0 drive (the recording and playback device according to the present embodiment).

The processing at Step S24 performs the restoration processing for the information that is read from the wobbling grooves of the Ver. 2.0 disc.

This is done because the bit inversion processing has been performed by the transformation processing at Step S22 during the mastering for the data in the specified nibbles in the ADIP information.

Here, too, "111100010000100" is shown at Step S24.

In the same manner as described above, a 1 indicates that the bit inversion processing will be performed, and a 0 indicates that the bit inversion processing will not be performed, with each of the positions corresponding to one of the fifteen nibbles. Therefore, in the same manner as in the processing at Step S22, the bit inversion processing will be performed for Nibble14, Nibble13, Nibble12, Nibble11, Nibble7, and Nibble2, which correspond to the 1's, and the bit inversion processing will not be performed for the other nibbles.

This produces the ADIP information that is shown in FIG. 12 as the error correction encoded data at the point in time when the ECC encoding was done during the mastering in the processing at Step S21.

The processing at Step S25 performs the error correction decoding for the ADIP information (the error correction encoded data in the 60-bit units in FIG. 12). In this case, the error correction decoding is performed for the data for the ADIP information that was ECC encoded in the processing at Step S21 and were restored by the restoration processing at Step S24, so the wobble address information (A0 to A23 in FIG. 10-10b) is correctly decoded.

The wobble addresses can thus be properly read during the recording and the playback of the Ver. 2.0 disc by the Ver. 2.0 drive. Therefore, ordinary playback access and recording access can be performed using the wobble addresses, so the playback operation and the recording operation can be performed properly.

On the other hand, the processing at Steps S27 to S29 shows the address processing in a case where the Ver. 2.0 disc for which the wobbling grooves have been formed as described above is recorded and played hack on the Ver. 1.0 drive (the known playback device).

The processing at Step S27 performs the bit inversion processing for the information that is read from the wobbling grooves of the Ver. 2.0 disc.

However, the processing is not what is called the restoration processing in the present example, which is the counterpart of the transformation processing at Step S22, but is rather processing that is performed by the known recording and playback device.

With regard to the address processing according to the wobbling grooves, the processing that inverts the six nibbles among the fifteen nibbles is performed during the mastering and when the wobble addresses are read.

This is done in order to avoid a case in which the error correction result is wrongly deemed to be OK if the ADIP information that is input to the ECC decoding processing is all zeroes, as when the address information is not input, for example. For the Ver. 1.0 disc, as shown in FIG. 13, the inversion for the fifteen nibbles is described as "000000000111111" (the inversion of Nibble5 to Nibble0), and it is performed during the mastering and when the wobble addresses are read.

When the address information is decoded by the Ver. 1.0 drive, this sort of inversion processing is performed as the processing at Step S27. Then the ECC decoding processing is performed as the processing at Step S28 for the address information for which the inversion processing has been performed.

At this point, for the Ver. 2.0 disc, the bit inversion processing of "111100010000100" has been performed by the transformation processing at Step S22.

Therefore, the ADIP information that is provided to the ECC decoding is in a state of being "111100010111011", because the inversion processing with the pattern of "000000000111111" at Step S27 has been added to the result of the inversion processing of "111100010000100" at Step S22.

In other words, the ADIP information that was ECC encoded by the processing at Step S21 is in a state where Nibble14, Nibble13, Nibble12, Nibble11, Nibble7, Nibble5, Nibble4, Nibble3, Nibble1, and Nibble0 have been inverted.

The error correction decoding cannot be performed for this sort of ADIP information, so the result of the error correction is a decode failure (DF), a failure to correct the errors.

In other words, the wobble addresses (A0 to A23) cannot be correctly decoded by the processing at Step S29.

Thus, during the recording and the playback of the Ver. 2.0 disc by the Ver. 1.0 drive, the wobble addresses in the data cannot be read properly. Therefore, ordinary playback access and recording access cannot be performed, so error processing is performed, and the playback operation and the recording operation are not started. In other words, it is possible to make it impossible to record and play back the Ver. 2.0 disc on the Ver. 1.0 drive.

Note that, as described above, the addresses in the data on the Ver. 2.0 disc also cannot be read by the Ver. 1.0 drive.

In the case of the recordable type of disc, if the recording of the main data has been completed, and if the addresses in the data can be read, playback may be possible even if the wobble addresses cannot be read. However, by making it such that neither the wobble addresses nor the addresses in the data can be read, it is possible to make it completely impossible for the Ver. 1.0 drive to record and play back the recordable type of Ver. 2.0 disc.

Incidentally, in the transformation processing at Step S22 and the restoration processing at Step S24, the inversion of the fifteen nibbles (Nibble14 to Nibble0) is performed in accordance with the positions "111100010000100".

These nibble inversion positions have been selected so that the error correction will be certain to fail on the Ver. 1.0 drive.

During playback, the data are not always played back correctly, and that is primarily why the error correction is performed.

Because of this, even if the bit inversion processing is performed as the trans-formation processing, the data are sometimes in an uninverted state due to a decoding error. This means that, depending on the way that the decoding error occurs, there is a possibility that the error correction result will be OK in the Ver. 1.0 drive, despite the fact that the transformation processing was performed. This happens because the trans-formation of a portion of the data by the bit inversion is undone by the decoding error.

It is therefore necessary to select the transformation processing appropriately such that a decoding error will be certain to occur in the Ver. 1.0 drive, even if a decoding error has occurred. In the case of the wobble addresses, the positions of the nibbles for which the bit inversion is performed are crucial.

The ADIP information as described in FIG. 12 is the nibble-based RS (15, 9, 7), with the symbol using nine nibbles and the parity information using six nibbles, of which three nibbles can be corrected.

Even if decoding errors occur in three nibbles, no problem will occur if a DF (a failure to correct the errors) can occur in the Ver. 1.0 drive.

In other words, no problem will occur if this sort of pattern can be found as the pattern of the inversion positions in the fifteen nibbles.

Accordingly, the inversion positions were set by first defining all of the patterns that could be conceived as the inversion pattern for the fifteen nibbles, then verifying for all of the inversion position patterns whether or not an error correction failure occurs in a case where a bit decoding error has occurred.

In a case where a single error (a bit decoding error) occurs among the inversion positions in the fifteen nibbles, the pattern of the error occurrence will be one of fifteen patterns. It is possible to cause an error correction failure to occur in the Ver. 1.0 drive for all of the fifteen patterns when a single error occurs.

There are 1,575 possible patterns when two errors occur, and it is also possible to cause an error correction failure to occur for all of those patterns.

However, when verification is performed for the 102,375 patterns that are possible when three errors occur, it is also possible to cause an error correction failure to occur for only 95,717 of the patterns, and an error correction result of OK will be produced for the remaining 6,658 patterns. In other words, the probability that an error correction failure can be caused drops to approximately 95%.

Thus, for the total number of 103,965 error patterns, an error correction failure will occur for 97,307 patterns, and an error correction result of OK will be produced for the remaining patterns.

In other words, when more than two errors occur, it is difficult to cause an error correction failure to occur reliably. However, address consecutiveness detection is also routinely employed in the address decoding.

For example, assuming that the address values 00, 01, 02, and the like are determined to be consecutive, then even if a given address value is decoded, an address error will occur if the value is not consecutive with the values that precede and follow it. For example, in a case of non-consecutive values such as 00, 01, 85, an error will occur for the address value 85 even if the error correction result is OK.

Because address consecutiveness detection is routinely employed, even in the Ver. 1.0 drive, ultimately no problem will occur as long as an address error is produced as the consecutiveness detection result, even if the error correction result is OK.

It is therefore appropriate to select the pattern for the inversion positions for the fifteen nibbles that will produce the most error correction failures.

Figure 14:
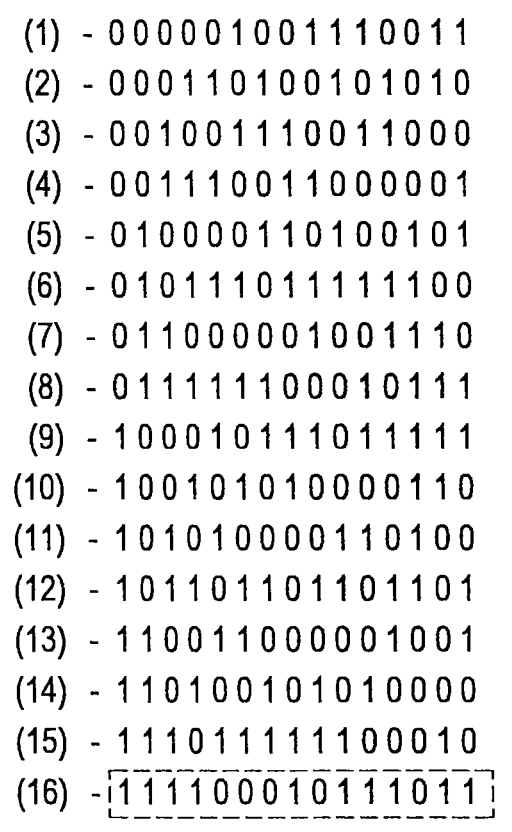

In the end, it was determined that the sixteen patterns (1) to (16) that are shown in FIG. 14 are the patterns that yield the most error correction failures in the Ver. 1.0 drive. (A "1" indicates that the nibble is inverted.)

These sixteen patterns have the highest probability of producing an error correction failure in relation to the occurrence of various types of decoding errors when the ECC decoding processing is performed by the Ver. 1.0 drive in a state in which the inversion has been applied to the data in the fifteen ECC encoded nibbles.

The example that is shown in FIG. 13 uses pattern (16), "111100010111011". As described above, the inversion processing with the pattern of "000000000111111" is performed by the Ver. 1.0 drive as the processing at Step S27. Therefore, in order to perform the ECC decoding with the data in the state of having been inverted according to pattern (16), "111100010111011", the inversion according to the pattern "111110010000100", which results from an EX-OR operation on "111100010111011" and "000000000111111", may be applied in advance. In other words, performing the bit inversion processing at Step S22 for the nibbles whose positions are indicated by the 1's in "111110010000100" makes it possible to reliably create a state in the Ver. 1.0 drive in which recording and playback are impossible, due to an address error, even when a decoding error has occurred.

Note that the patterns (1) to (15) in FIG. 14 may also be used. That is, the pattern that results from performing the EX-OR operation on any one of the patterns (1) to (15) and "000000000111111" may serve as the pattern for the bit inversion processing at Step S22.

In those cases as well, it is possible to reliably create a state in the Ver. 1.0 drive in which recording and playback are impossible.

4. Disc Drive Device

Figure 15:
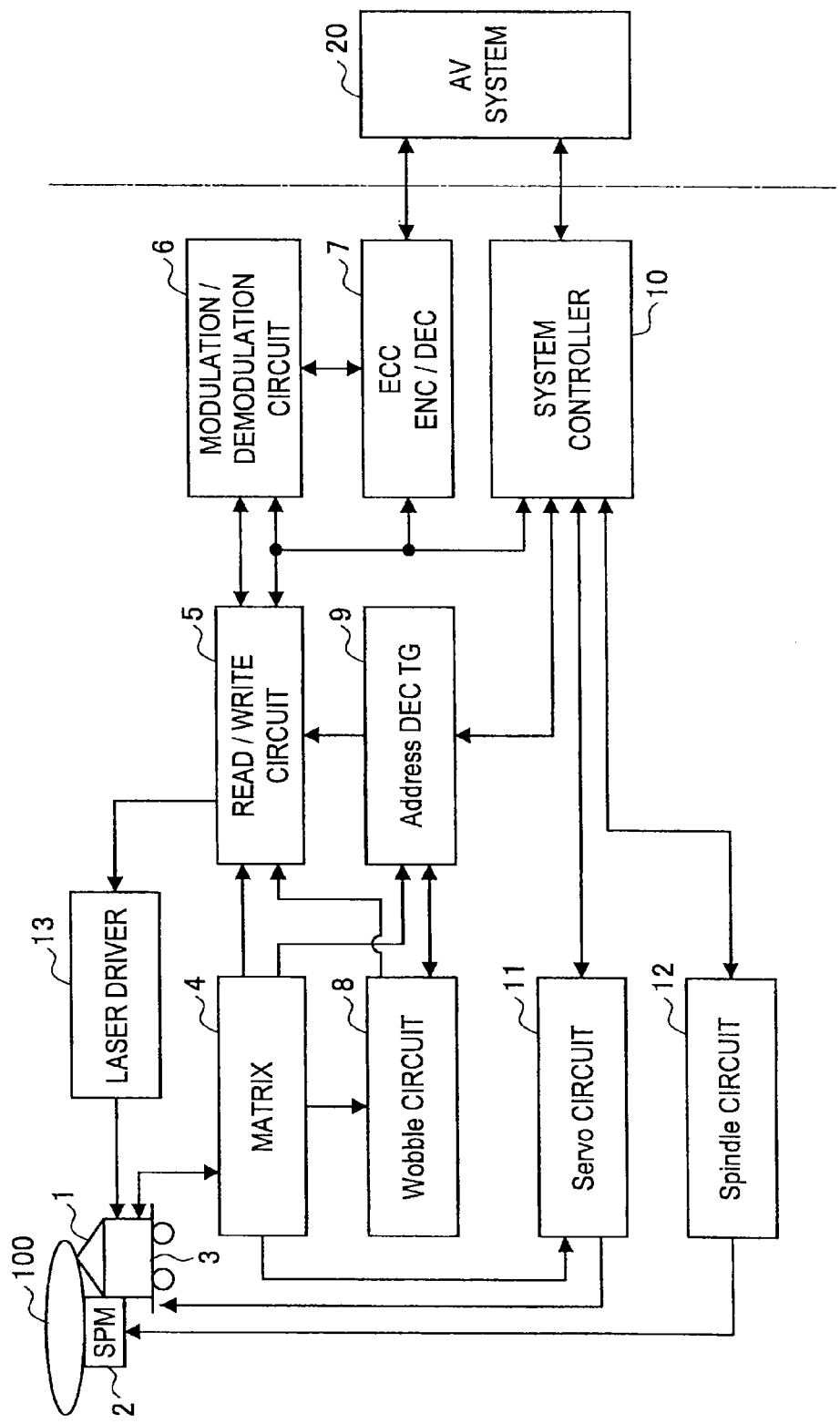
FIG. 15 is a block diagram of a disc drive device according to the embodiment.

The configuration of the disc drive device (the Ver. 2.0 drive) that is an embodiment of the recording device and the playback device according to the present invention is shown in FIG. 15. In other words, this is the disc drive device that performs the processing at Steps S1 to S6 in FIG. 9 during the recording, and during the playback, performs the processing at Steps S7 to S11 in FIG. 9 and the processing at Steps S24 to S26 in FIG. 13.

The disc 100 (the Ver. 2.0 disc) is placed on a turntable that is not shown in the drawings, and during the recording and playback operations, it is rotationally driven at a constant linear velocity (a CLV) by a spindle motor 2.

In a case where the disc 100 is the recordable type of disc, the ADIP information that is embedded in the form of the wobbles in the groove tracks on the disc 100 is read by an optical pick-up 1.

During the recording, the main data are recorded in the tracks by the optical pick-up 1 in the form of one of the phase change marks and the pigment change marks, and during the playback, the recorded marks (the user data, the addresses in the data, and the like) are read by the optical pick-up 1.

In a case where the disc 100 is the playback-only type of disc, the user data, the addresses in the data, and the like are read from the tracks by the optical pick-up 1 in the form of the embossed pit rows on the disc 100.

A laser diode that serves as the source of the laser beam, a photo-detector for detecting the reflected beam, a field lens on the output side of the laser beam, and an optical system (not shown in the drawings) that directs the laser beam through the field lens and onto the disc recording surface and that guides the reflected beam to the photo-detector are provided within the optical pick-up 1.

The laser diode outputs what is called a blue laser that has a wavelength of 405 nanometers. The NA of the optical system is 0.85.

The field lens is held within the optical pick-up 1 by a biaxial mechanism, such that it can be moved in a tracking direction and in a focusing direction.

Further, the entire optical pick-up 1 can be moved in the radial direction of the disc by a sled mechanism 3.

The laser diode in the optical pick-up 1 is driven to emit the laser beam by a drive signal (a drive current) from a laser driver 13.

The reflected beam information from the disc 100 is detected by the photo-detector, converted into an electrical signal in accordance with the amount of the received light, and supplied to a matrix circuit 4.

A current-voltage conversion circuit, a matrix computation/amplification circuit, and the like are provided in the matrix circuit 4, and required signals are generated by matrix computation processing in response to the output voltage from a plurality of light receiving elements that serve as the photo-detector.

For example, a high-frequency signal (a playback data signal) that corresponds to the playback data, a focus error signal for servo control, a tracking error signal, and the like are generated.

A push-pull signal is also generated as a signal that is related to the wobbles in the grooves, that is, as a wobble detection signal.

The playback data signal that is output from the matrix circuit 4 is supplied to a read/write circuit 5, the focus error signal and the tracking error signal are supplied to a servo circuit 11, and the push-pull signal is supplied to a wobble circuit 8.

By performing binarization processing on the playback data signal, playback clock signal generation processing using a PLL, and the like, the read/write circuit 5 plays back the data that were read by the optical pick-up 1, then supplies the data to a modulation/demodulation circuit 6.

The modulation/demodulation circuit 6 is provided with a functional portion that serves as a decoder during playback and a functional portion that serves as an encoder during recording.

During playback, demodulation processing is performed as the decoding processing with respect to the RLL (1, 7) PP modulation, based on the playback clock signal.

An ECC encoder/decoder 7 performs the ECC encoding processing that appends the error correcting codes during recording and the ECC decoding processing that performs the error correction during playback.

During playback, the data that have been demodulated by the modulation/demodulation circuit 6 are taken into an internal memory, and the playback data are produced by performing the error detection/correction processing, deinterleaving, and the like. The data that have been decoded into the playback data by the ECC encoder/decoder 7 are read based on a command from a system controller 10 and are transmitted to an audio-visual (AV) system 20. In addition, the addresses in the data (AUN0 to AUN3) that have been decoded by the ECC encoder/decoder 7 are supplied to the system controller 10 and are used for the access processing and the like.

The push-pull signal that is output from the matrix circuit 4 as the signal that is related to the wobbles in the grooves is processed by the wobble circuit 8. The push-pull signal serves as the ADIP information, and it is MSK demodulated and STW demodulated in the wobble circuit 8, being demodulated into a data stream that configures the ADIP addresses and that is supplied to an address decoder 9.

The address decoder 9 produces the address values for the wobble addresses by performing decoding of the supplied data, then supplies the address values to the system controller 10.

The address decoder 9 also performs PLL processing, using a wobble signal that is supplied by the wobble circuit 8, to generate a clock signal that is supplied to various portions for use as an encoding clock signal during recording, for example.

During recording, the recording data are transmitted from the AV system 20, but the recording data are buffered by being transmitted to a memory in the ECC encoder/decoder 7.

In this case, the ECC encoder/decoder 7 performs the appending of the error correcting codes, the appending of interleaves, subcodes, and the like, as the encoding processing for the buffered recording data.

The ECC encoded data are modulated by the RLL (1, 7) PP method in the modulation/demodulation circuit 6 and are supplied to the read/write circuit 5.

The clock signal that is generated from the wobble signal as described above is used as the encoding clock signal that serves as the reference clock signal for the data encoding processing during recording.

The recording data that are generated by the encoding processing are transmitted as laser pulses to the laser driver 13 after the read/write circuit 5 performs recording compensation processing that includes fine tuning of the optimum recording power, adjustment of the laser drive pulse waveform, and the like in consideration of the characteristics of the recording layer, the shape of the laser beam spot, recording linear velocity, and the like.

The laser driver 13 drives the emission of the laser beam by transmitting the supplied laser drive pulse to the laser diode in the optical pick-up 1. This causes the marks to be formed on the disc 100 in accordance with the recording data.

Note that the laser driver 13 is provided with what is called an automatic power control (APC) circuit that monitors the laser output power, based on the output from a laser power monitor detector that is provided in the optical pick-up 1, and keeps the laser output constant, irrespective of the laser output temperature and the like. The target values for the laser output during recording and during playback are provided by the system controller 10, the laser output levels during recording and during playback are controlled such that the respective target values are achieved.

The servo circuit 11 performs servo operations by generating various types of servo drive signals for the focus, the tracking, and the sled, based on the focus error signal and the tracking error signal from the matrix circuit 4.

In other words, the servo circuit 11 generates a focus drive signal and a tracking drive signal in accordance with the focus error signal and the tracking error signal, which in turn drive a focus coil and a tracking coil in the biaxial mechanism in the optical pick-up 1. Thus a tracking servo loop and a focus servo loop are formed by the optical pick-up 1, the matrix circuit 4, the servo circuit 11, and the biaxial mechanism.

The servo circuit 11 also performs a track jump operation in accordance with a track jump command from the system controller 10 by turning off the tracking servo loop and outputting a jump drive signal.

The servo circuit 11 also drives the sled mechanism 3 by generating a sled drive signal based on a sled error signal that is produced as a low-pass component of the tracking error signal, as well as on access execution control from the system controller 10, and the like. The sled mechanism 3 includes a mechanism, not shown in the drawings, that is configured from a main shaft that holds the optical pick-up 1, a sled motor, a transmission gear, and the like, and the mechanism performs a sliding movement of the optical pick-up 1 by driving the sled motor in accordance with the sled drive signal.

A spindle servo circuit 12 performs control that causes the spindle motor 2 to rotate at a constant linear velocity.

The spindle servo circuit 12 generates a spindle error signal by taking the clock signal that is generated by the PLL processing of the wobble signal, treating the clock signal as information on the current rotational velocity of the spindle motor 2, and comparing the clock signal to specified CLV reference velocity information.

During data playback, the spindle error signal can also be generated by taking the playback clock signal that is generated by the PLL in the read/write circuit 5 (the clock signal that serves as the reference for the decoding processing), which also serves as information on the current rotational velocity of the spindle motor 2, and comparing the playback clock signal to the specified CLV reference velocity information. The spindle servo circuit 12 also outputs a spindle drive signal that is generated in accordance with the spindle error signal and causes the spindle motor 2 to rotate at a constant linear velocity.

The spindle servo circuit 12 also generates the spindle drive signal in accordance with a spindle kick/brake control signal from the system controller 10, the spindle drive signal causing the spindle motor 2 to perform operations such as starting, stopping, acceleration, deceleration, and the like.

The various types of operations of the servo system and the recording and playback system that are described above are controlled by the system controller 10, which is configured from a microcomputer.

The system controller 10 performs various types of processing in accordance with commands from the AV system 20.

For example, when the AV system 20 outputs a write command, the system controller 10 first moves the optical pick-up 1 to the address where the writing will be done. Then the ECC encoder/decoder 7 uses the modulation/demodulation circuit 6 to perform the previously described encoding processing for the data that are transmitted from the AV system 20 (for example, video data, audio data, and the like in various types of formats such as MPEG2 and the like). Then the recording is performed as described earlier by supplying the laser drive pulse from the read/write circuit 5 to the laser driver 13.

Furthermore, in a case where a read command, for example, is provided from the AV system 20 and requires the transmission of certain data that are recorded on the data storage portion 10 (MPEG2 video data or the like), first, seek operation control is performed for which a designated address is the target. That is, a command is output to the servo circuit 11, causing the optical pick-up 1 to perform an access operation for which the target is address that is designated by the seek command.

Thereafter, the operation control is performed that is necessary in order to transmit the data in the designated data interval to the AV system 20. In other words, the reading of the data from the disc 100 is performed, the decoding, buffering, and the like are performed in the read/write circuit 5, the modulation/demodulation circuit 6, and the ECC encoder/decoder 7, and the requested data are transmitted.

Note that during the recording and the playback of the data, the system controller 10 performs control of access and of the recording and playback operations by using the wobble addresses that are detected by the wobble circuit 8 and the address decoder 9, as well as the addresses in the data that are obtained by the ECC encoder/decoder 7.

In this case, the ECC encoder/decoder 7 performs the processing at Steps S1 to S4 in FIG. 9 during the recording.

That is, in the processing at Step S1, the ECC encoder/decoder 7 generates the address unit numbers (AUN0 to AUN3) and the flag data for recording the addresses in the data. Then in the processing at Step S2, the ECC encoder/decoder 7 performs the ECC encoding.

The four parity symbols (Parity0 to Parity3) are generated for five symbols that contain AUN0 to AUN3 and the flag data.

Then the ECC encoder/decoder 7 performs the bit inversion processing as the transformation processing at Step S3 for the four symbols AUN0, AUN1, Parity3, and Parity2. The symbols that are the result of the inversion processing are used to form the address fields that serve as the ECC encoding block.

The ECC encoded data are supplied to the modulation/demodulation circuit 6, where they are RLL (1, 7) PP modulated by the processing at Step S5. Then, in the processing at Step S6, the data recording is performed by using the read/write circuit 5 and the laser driver 13 to drive the emission of the laser beam based on the modulated signal.

In addition, the ECC encoder/decoder 7 performs the processing at Steps S8 to S11 in FIG. 9 during the playback.

The information that is read from the disc 100 is demodulated by the matrix circuit 4, the read/write circuit 5, and the modulation/demodulation circuit 6 as described earlier (Step S7).

Thus, with respect to the address information, the data in the various address fields that configure the address units AU0 to AU15 in FIG. 7-7a are obtained and are supplied to the ECC encoder/decoder 7.

However, because the bit inversion processing was performed on the data in the specified address fields by the transformation processing at Step S3 during the recording, the ECC encoder/decoder 7 performs the decoding processing as the processing at Step S8. For example, the ECC encoder/decoder 7 may perform the bit inversion processing for the four symbols AUN0, AUN1, Parity3, and Parity2 among the nine symbols that configure the address unit AU. The decoding processing yields the original data in the address fields (Step S9).

The ECC encoder/decoder 7 then performs the ECC decoding processing as the processing at Step S10. The address information (AUN0 to AUN3) is thus decoded, and the ECC encoder/decoder 7 supplies the address information to system controller 10.

During the recording and the playback of the recordable type of the disc 100, the processing at Steps S24 to S26 in FIG. 13 is performed by the address decoder 9. The address decoder 9 performs the decoding processing for the information that is read from the wobbling grooves of the disc 100 as the processing at Step S24. For example, in the case in FIG. 13, where the information is shown as "111100010000100", the bit inversion processing is performed for Nibble14, Nibble13, Nibble12, Nibble11, Nibble7, and Nibble2.

The ADIP information at the time of the ECC encoding is thus produced. In that state, the ECC decoding is performed as the processing at Step S25, and the wobble addresses are decoded (Step S26). The wobble addresses are supplied to the system controller 10.

By performing the processing that is described above, the disc drive device in the present example can properly read the addresses in the data and the wobble addresses on the Ver. 2.0 disc during recording and playback. This makes it possible to perform the playback operation and the recording operation properly.

Note that the example configuration in FIG. 15 shows the disc drive device that is connected to the AV system 20, but the disc drive device according to the present embodiment may also be connected to a personal computer or the like, for example.

Moreover, a configuration in which the disc drive device is not connected to another unit is also possible. In that case, an operation portion and a display portion would be provided, and the configuration of the data input interface would be different from that in FIG. 15. In other words, the recording and the playback would be performed in accordance with a user operation, and terminals for the input and output of various types of data would be provided.

Many other configuration examples are also obviously conceivable, and examples of a recording-only device and a playback-only device are conceivable.

5. Mastering Device

The mastering device that is an embodiment of the recording device according to the present invention will be explained.

The disc manufacturing processes are divided roughly into what is called master disc processes and replication processes. The master disc processes are processes up to the completion of a metal master disc (a stamper) that is used in the replication processes, and replication processes are processes that use the stamper to produce in large volume optical discs that are replicas.

In concrete terms, the master disc processes include coating a polished glass substrate with a photo-resist, and what is called cutting, which forms the pits and the grooves by exposing this light-sensitive film to a laser beam.

In the case of the present example, the cutting of the grooves is performed by the wobbling that is based on the pre-recorded information in the area that corresponds to the PB zone (refer to FIG. 2) at the innermost edge of the disc. The cutting of the grooves is also performed by the wobbling that is based on the ADIP addresses in the area that corresponds to the RW zone. The pre-recorded information that is recorded is prepared in a preparatory process that is called pre-mastering.

After the cutting has been completed and specified processes such as the developing have been performed, the transfer of the information to the metal surface is performed by electrocasting, for example, and the stamper is thus created that is needed when the replication of the disc is performed.

Next, after the information has been transferred onto a resin substrate by an injection method or the like, for example, and a light reflecting coating has been formed on top of that, the necessary processing is performed, such as machining the disc form and the like, and the final product is completed. This becomes the Ver. 2.0 disc in the present example.

The mastering device is provided with a pre-recorded information generation portion 71, an address generation portion 72, a switching portion 73, a cutting portion 74, and a controller 70.

The pre-recorded information generation portion 71 outputs the pre-recorded information that is prepared in the pre-mastering process.

The address generation portion 72 sequentially outputs values as absolute addresses.

The cutting portion 74 is provided with optical portions (82, 83, 84) that perform cutting by directing a laser beam onto a glass substrate 101 that has been coated with an inorganic resist or the like.

The cutting portion 74 also includes a substrate rotation/transport portion 85 drives the glass substrate 101 rotationally and moves it by sliding. The cutting portion 74 is also provided with a signal processing portion 81 and a sensor 86. The signal processing portion 81 converts the input data into the recording data and supplies them to the optical portions. The sensor 86 makes it possible to distinguish, based on the position of the substrate rotation/transport portion 85, whether the cutting position is in the PB zone or the RW zone.

A laser beam source 82, a modulation portion 83, and a cutting head 84 are provided as the optical portions that are mentioned above. The beam that is output from the laser beam source 82 is modulated by the modulation portion 83 based on the recording data. The cutting head 84 concentrates the modulated beam from the modulation portion 83 and directs it onto the photo-resist surface of the glass substrate 101.

The modulation portion 83 includes an acousto-optic beam modulator (AOM) that turns the output beam from the laser beam source 82 on and off, as well as an acoustooptic beam deflector (AOD) that deflects the output beam from the laser beam source 82 based on a wobble generation signal.

Furthermore, the substrate rotation/transport portion 85 is configured such that it includes, among other elements, a rotary motor that rotationally drives the glass substrate 101, a detection portion (an FG) that detects the rotation speed of the rotary motor, a slide motor for sliding the glass substrate 101 in its radial direction, and a servo controller that controls the rotation speeds of the rotary motor and the slide motor, the tracking of the cutting head 84, and the like.

The signal processing portion 81 performs modulated signal generation processing that forms a modulated signal by performing formatting processing that forms the input data by appending the error correcting codes, for example, to the pre-recorded in-formation and the address information that are supplied through the switching portion 73, for example, and by performing specified computational processing on the data that are output from the formatting processing.

Drive processing is also performed that drives the beam modulator and the beam deflector in the modulation portion 83 based on the modulated signal.

In the cutting portion 74, during the cutting, the substrate rotation/transport portion 85 rotationally drives the glass substrate 101 at a constant linear velocity and also slides the glass substrate 101 as it rotates, such that the spiral-shaped track is formed at the specified track pitch.

At the same time, the beam that is output from the laser beam source 82 is converted into the modulated beam by the modulation portion 83, based on the modulation signal from the signal processing portion 81, and is directed onto the photo-resist surface of the glass substrate 101 by the cutting head 84, such that the photo-resist reacts to the beam based on the data and the grooves.

The controller 70 controls the performance of the operations during the cutting by the cutting portion 74 and also controls the pre-recorded information generation portion 71, the address generation portion 72, and the switching portion 73 while monitoring the signal from the sensor 86.

When the cutting starts, the controller 70 defines the slide position of the substrate rotation/transport portion 85 as the initial position for the cutting portion 74, such that the cutting head 84 will start emitting the laser beam from the innermost edge. Then the controller 70 starts the driving of the glass substrate 101 at the constant linear velocity and the sliding of the glass substrate 101 in order to form the grooves at the specified track pitch.

In this state, the pre-recorded information is output from the pre-recorded information generation portion 71 and is supplied to the signal processing portion 81 through the switching portion 73. Furthermore, the laser output from the laser beam source 82 is started, and the modulation portion 83 modulates the laser beam based on the modulated signal from the signal processing portion 81, that is, the modulated signal in which the pre-recorded information is encoded by frequency modulation, thus performing the groove cutting on the glass substrate 101.

The groove cutting is thus performed in the area that corresponds to the PB zone.

Thereafter, when the controller 70 has detected, based on the signal from the sensor 86, that the cutting operation has advanced to the position that corresponds to the PB zone, the controller 70 switches the switching portion 73 to the address generation portion 72 side and issues a command to generate the address values sequentially from the address generation portion 72.

The address information is thus supplied from the address generation portion 72 to the signal processing portion 81 through the switching portion 73. Next, the laser beam from the laser beam source 82 is modulated in the modulation portion 83 based on the modulated signal from the signal processing portion 81, that is, the modulated address information signal, and the groove cutting on the glass substrate 101 is performed in accordance with the modulated laser beam.

Thus the cutting of the grooves that contain the wobble addresses is performed in the area that corresponds to the RW zone.

When the controller 70 has detected, based on the signal from the sensor 86, that the cutting operation has reached the final edge of the lead-out zone, the controller 70 terminates the cutting operation.

This sort of operation forms an exposed portion on the glass substrate 101 that corresponds to the wobbling grooves of the PB zone and the RW zone.

Thereafter, the stamper is created by developing, electrocasting, and the like, and the disc that is described above is produced using the stamper.

Here, the signal processing portion 81 performs the processing at Steps S21 and S22 in FIG. 13 with respect to the address information that is sequentially supplied from the address generation portion 72.

The address generation portion 72 performs the processing at Step S20 in FIG. 13 that generates the address data. In other words, the address generation portion 72 outputs the 24 bits (six nibbles) of the wobble address that is shown in FIG. 10-10*b*.

The signal processing portion 81 performs the ECC encoding as the processing at Step S21. In other words, for the six nibbles of the wobble address that was generated at Step S20, the signal processing portion 81 produces the error correction encoded data with the structure that is shown in FIG. 12 by generating the three nibbles of the auxiliary data and the six nibbles of the parity information. The signal processing portion 81 then performs the nibble transformation processing as the processing at Step S22. In other words, the signal processing portion 81 performs the bit inversion processing for Nibble14, Nibble13, Nibble12, Nibble11, Nibble7, and Nibble2 as the bit inversion processing that is shown as "111100100000100" in FIG. 13.

The signal processing portion 81 controls the modulation portion 83 by generating the modulated signal in accordance with the ADIP information that has been processed in this manner.

The exposure processing that is shown in FIG. 13 is thus performed for the wobble addresses.

Note that the mastering device in a case where it is assumed that the disc is the playback-only type performs the exposure for the pit rows without doing so for the wobbling grooves.

In that case, the address information and the user data are encoded with the previously described structures in FIG. 3 and FIGS. 6 to 8, and the laser beam from the laser beam source 82 is modulated in accordance with the encoded data.

Figure 16:
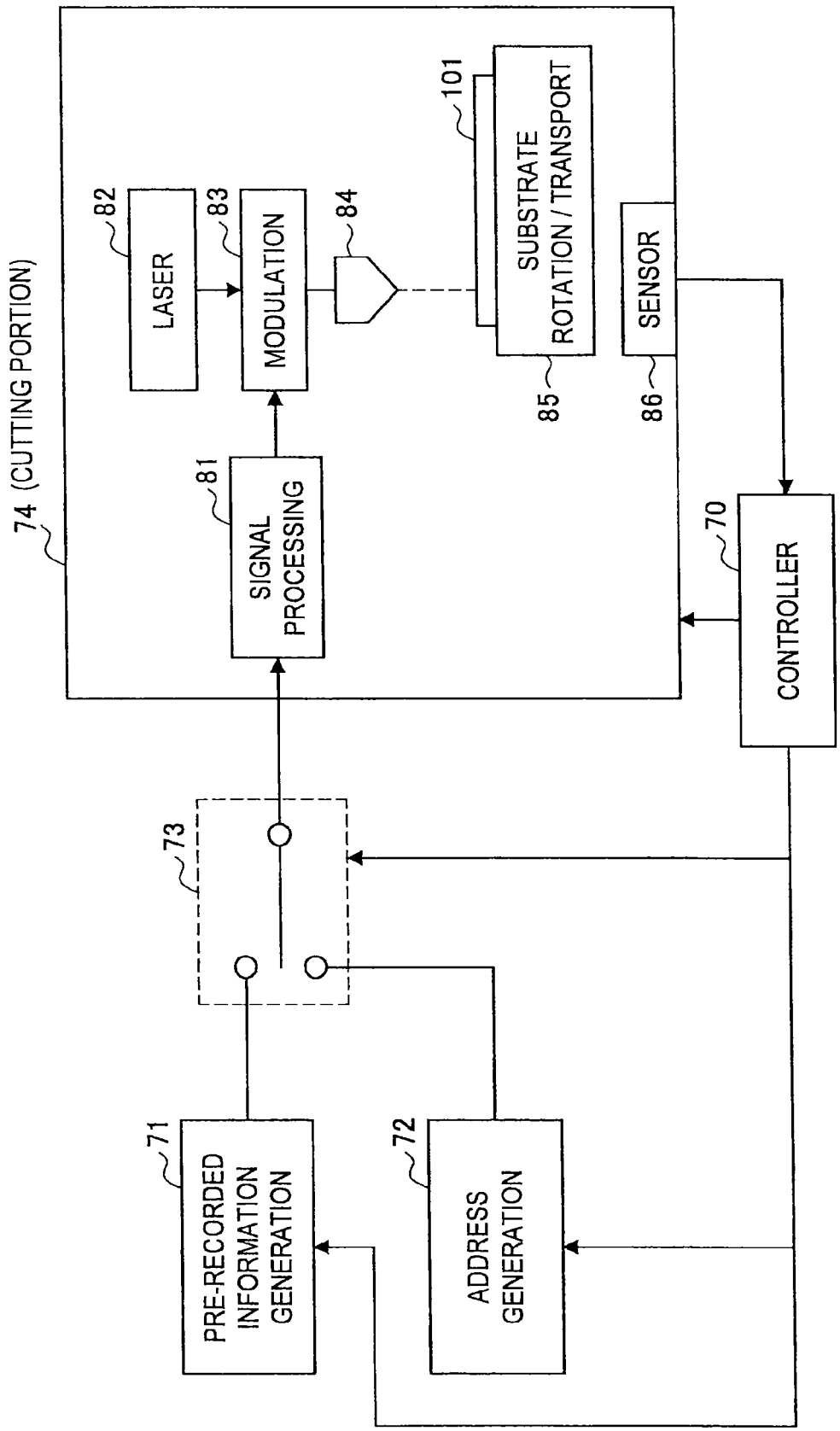
FIG. 16 is a block diagram of a mastering device that manufactures the disc according to the embodiment.

In the case of the mastering device of this type, a user data generation portion is provided instead of the pre-recorded information generation portion 71 in FIG. 16. Furthermore, the ECC encoding of the user data and the address information (AUNs) from the address generation portion 72 is performed by the signal processing portion 81. The processing at Steps S2 to S5 in FIG. 9 is performed at this time.

The pit row exposure of the master disc for manufacturing the playback-only disc as the Ver. 2.0 disc is thus performed. Thereafter, the Ver. 2.0 disc is manufactured by performing the developing, the stamper manufacturing, the substrate creation, and the layer formation for the recording layer, the cover layer, and the like.

The disc according to the present embodiment, as well as the disc drive device and the mastering device that are compatible with the disc, have been explained, but the present invention is not limited to these examples, and various modifications are conceivable within the scope of the present invention.

It should be understood by those skilled in the art that various modifications, combinations, sub-combinations and alterations may occur depending on design requirements and other factors insofar as they are within the scope of the appended claims or the equivalents thereof.

Figure 17:
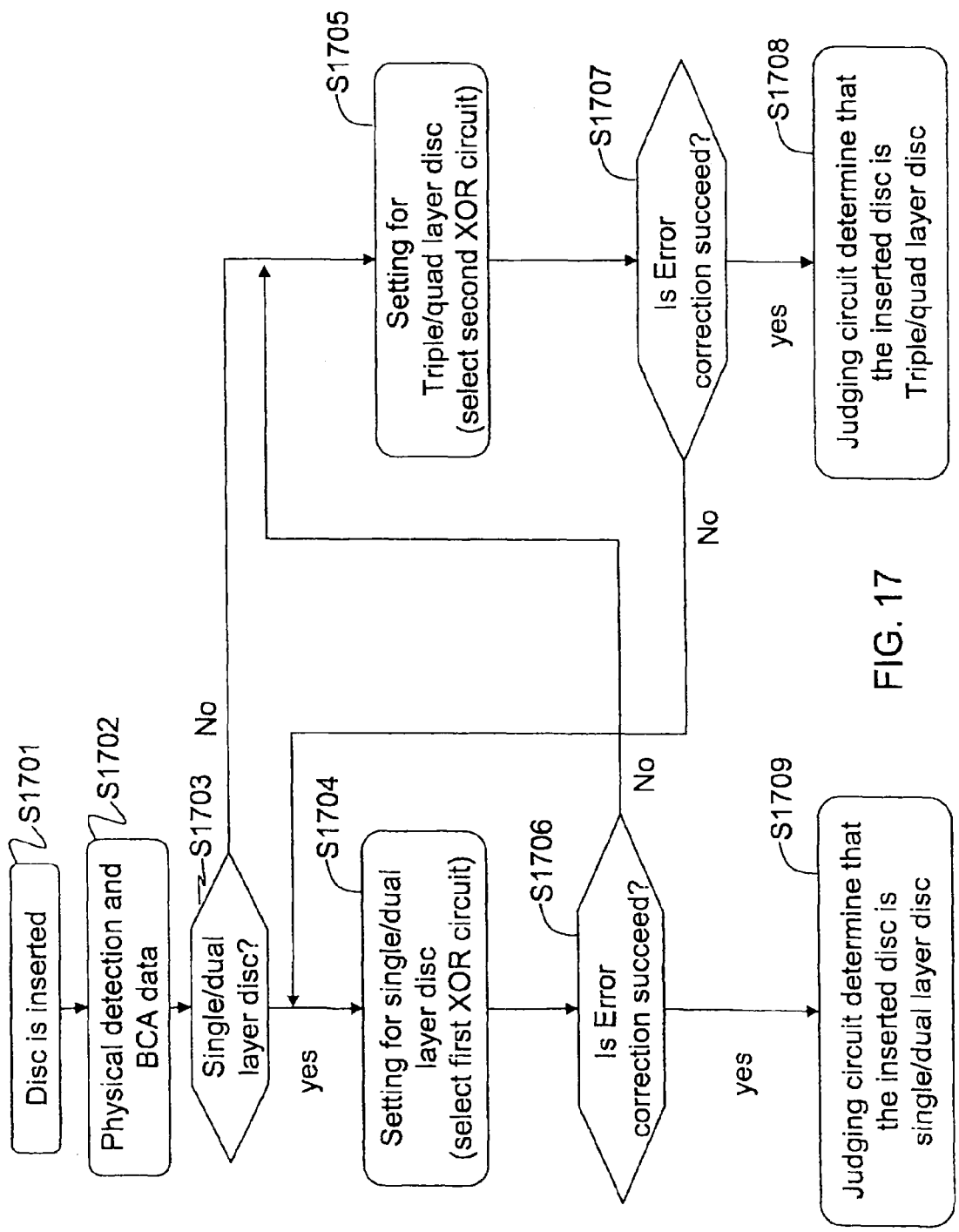
FIG. 17 is a flowchart showing a process for detecting whether a disc is a triple/quad layer disc and performing subsequent processing accordingly.

FIG. 17 is a flowchart showing a computer-implemented process for determining whether a disc is a single/dual layer disc, or a triple/quad disc. If a drive has a capability to record data to not only triple/quad layer discs but also to single/dual layer discs, then the drive needs to distinguish between these discs to apply different inversion for address data. The process begins in step S1701 where the disc is inserted into a playback device, and then in step S1702 the presence of the disc is detected and data in the BCA is read. Step S1702 may alternately or complementarily use a pull-in (PI) signal or focus error to physically determine the number of layers on a disc. An example of physical detection is disclosed in U.S. Pat. No. 6,005,832, the entire contents of which being incorporated herein by reference. A layer flag may also be read directly from the BCA zone, where the flag indicates whether the disc is a single/dual layer disc (earlier generation), or triple/quad layer disc (later generation) disc. For example, the absence of a flag means the disc is a single/dual layer disc. The presence of a flag indicates the disc is a triple/quad layer disc. Alternatively the flag can indicate a number of recording layers directly, such as 1, 2, 3 or 4 layers.

The process then proceeds to step S1703 where an inquiry is made regarding whether the disc is a single/dual disc, and then proceeds to step S1705 where address processing is set for a triple/quad layer disc. However, if the response to the inquiry in step S1703 is affirmative, the process proceeds to step S1704 where a setting is made for address processing for an earlier generation disc (e.g. single/dual layer disc). After steps S1705 and S1704 are performed, respective inquiries are made at steps S1707 and S1706 regarding whether error correction is successfully performed, such as by comparing the error rate to a predetermined threshold, such as $\frac{1}{100}$, $\frac{1}{1000}$, $\frac{1}{10000}$, or $\frac{1}{100000}$ for example. If it is not, then the process proceeds to step S1704 from S1707 for attempting to perform address processing according to a single/dual layer disc, despite the conclusion in step 1703 that the layer is not a single/dual layer disc. Thereafter, if the error correction is successfully performed in step S1706, it is determined in step S1709 that the disc is a single/dual layer disc.

On the other hand, if a negative result is determined from step S1706, the process proceeds to step S1705 where address processing settings are made presuming the disc is a triple/quad layer disc, and if error correction is successfully performed in step S1707, then in step S1708, it is determined that the disc is a triple/quad layer disc. In this figure, although it was explained that a drive can check the BCA data (flag data), it is not necessary to check this data. A drive can check the number of layers based on the physical detection (by using PI and/or focus error signals) roughly and the drive can set the selector based on the determination of the physical detection. Also, if the error correction circuit could not decode the address data correctly (e.g., above a predetermined error rate), the drive can change the setting as described the arrow from S1706 to S1705 and from S1707 to S1704. Therefore the flag check for the drive is not always needed by the drive. Moreover, the flag check and physical check can be done optionally, alternatively, and/or complementarily.

Figure 18:
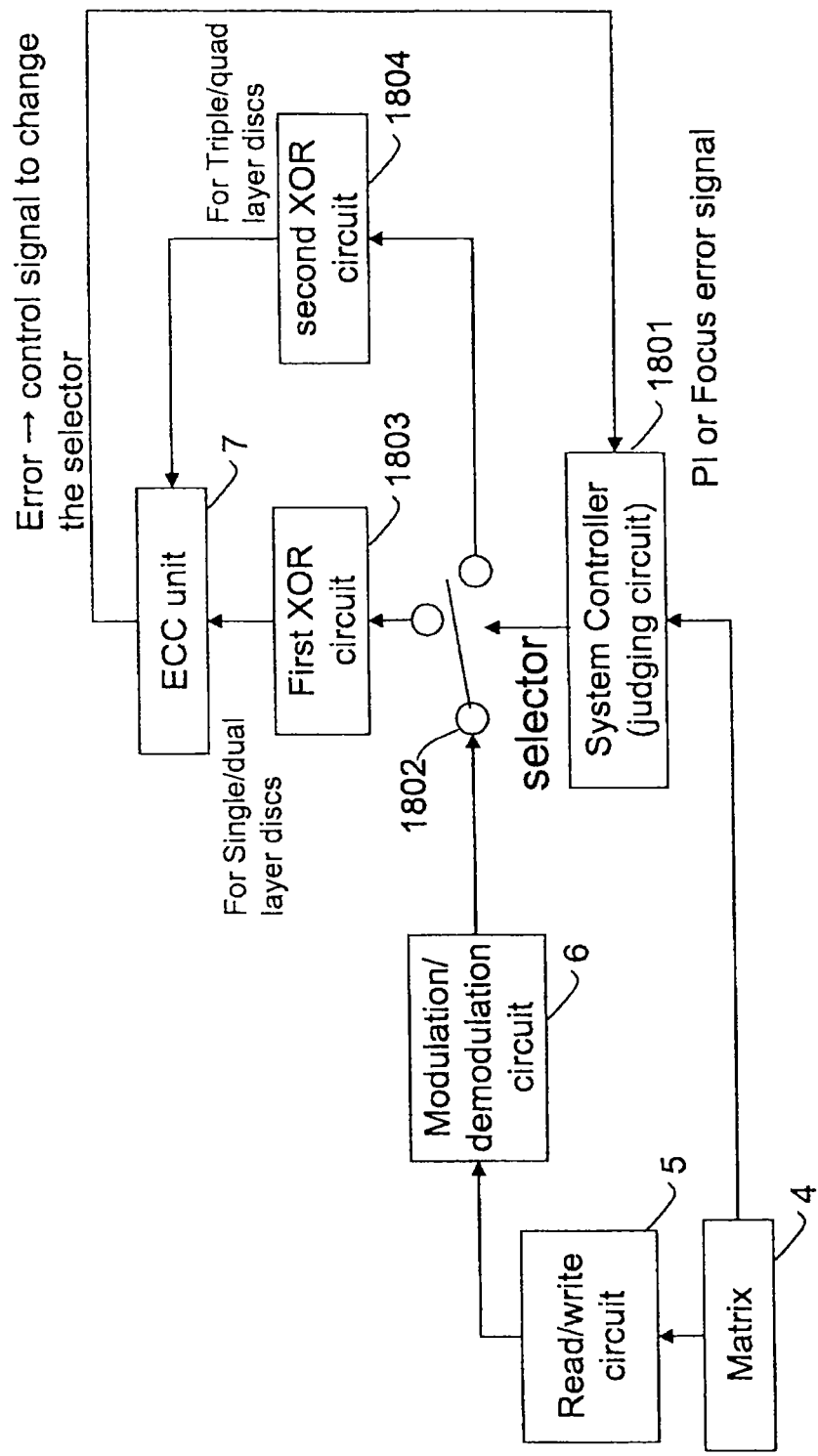
FIG. 18 is a block diagram showing processing modules, for selective processing prior to ECC processing, depending on whether the disc is judged as being a single/dual layer disc, or a triple/quad layer disc.

FIG. 18 is a block diagram similar to FIG. 15, but includes a system controller 1801 that serves as a judging device that based on an initial input from matrix 4, as well as a feedback signal from ECC unit 7, controls a selector 1802 to select between processing for single/dual layer disc, or triple/quad layer disc. In particular, if the system controller 1801 judges that the disc is a single/dual layer disc, the selector 1802 is connected to a first XOR circuit 1803. This first XOR circuit 1803 inverts address bits according to a first generation disc standard, which is applicable for single or dual layer disc. The output of the first XOR circuit 1803 is then applied to the ECC unit 7.

However, if the system controller 1801 judges that the disc is a triple/quad layer disc, the system controller 1801 sets the selector 1802 to be connected with the second XOR circuit 1804. The second XOR circuit 1804 inverts address bits according to the layer generation disc (triple/quad layer disc) prior to performing error correction in the ECC unit 7. The output of the ECC unit 7 is applied to the system controller 1801 in the form of a PI or focus error signal. Therefore when the presence of errors is detected in the ECC unit 7 to be above a predetermined level, the system controller 1801 judges that the present state of the selector 1802 is in an incorrect position, and changes the state of the selector 1802.

The present application contains subject matter related to that disclosed in Japanese Priority Patent Application JP 2009-114241 filed in the Japan Patent Office on May 11, 2009, the entire content of which is hereby incorporated by reference.

The invention claimed is:

1. A later generation optical disc encoded with computer readable address information, comprising:
    a substrate; and
    at least 3 data layers formed over the substrate, at least one of the 3 data layers having encoded original address information formed therein as partially inverted encoded original address information, the encoded original address information including the original address information and parity information generated based on the original address information, the original address information including address unit number information, and half of a plurality of fields of the address unit number information and half of a plurality of fields of the parity information being inverted,
    wherein a portion of said partially inverted encoded original address information being unique to a format for the later generation optical disc that is different than a format for an earlier generation optical disc.

2. The optical disc of claim 1, wherein the partially inverted encoded original address information causes the later generation optical disc to be incompatible with an earlier generation optical disc drive.

3. The optical disc of claim 1, wherein the partially inverted encoded original address information allows a later generation optical disc drive to read data therefrom with a data processing section configured to also process data from an earlier generation disc.

4. The optical disc of claim 1, wherein the partially inverted encoded original address information is formed in at least one of a 3rd data and 4th layer of the later generation optical disc.

5. The optical disc of claim 1, wherein the partially inverted encoded original address information is formed as a wobble groove.

6. A later generation optical disc encoded with computer readable address information, comprising:
    a substrate; and
    at least 3 data layers formed over the substrate, at least one of the 3 data layers having encoded original address information formed therein as partially inverted encoded original address information,
    wherein a portion of said partially inverted encoded original address information being a different portion that is inverted for an earlier generation optical disc, and an address format of the encoded original address information is arranged as 60 bits in 15 nibbles.

7. The optical disc of claim 6, wherein, the 15 nibbles have Nibble 14, Nibble 13, Nibble 12, Nibble 11, Nibble 7 and Nibble 2 being inverted such that an inversion vector is 111100010000100.

8. The optical disc of claim 6, wherein the partially inverted encoded original address information causes the later generation optical disc to be incompatible with an earlier generation optical disc drive.

9. The optical disc of claim 6, wherein the partially inverted encoded original address information allows a later generation optical disc drive to read data therefrom with a data processing section configured to also process data from an earlier generation disc.

10. The optical disc of claim 6, wherein the partially inverted encoded original address information is formed in at least one of a 3rd data layer and 4th data layer of the later generation optical disc.

11. The optical disc of claim 6, wherein the partially inverted encoded original address information is formed as a wobble groove.

* * * * *